United States Patent
Zabihi et al.

(10) Patent No.: US 7,487,236 B2
(45) Date of Patent: Feb. 3, 2009

(54) MANAGEMENT OF TIERED COMMUNICATION SERVICES IN A COMPOSITE COMMUNICATION SERVICE

(75) Inventors: Attaullah Zabihi, Kanata (CA); Joel Reginald Calippe, Gatineau (CA); Stephen Richard Morse, Nepean (CA); Chi Zhang, Nepean (CA)

(73) Assignee: Alcatel Lucent, Paris (FR)

( * ) Notice: Subject to any disclaimer, the term of this patent is extended or adjusted under 35 U.S.C. 154(b) by 569 days.

(21) Appl. No.: 11/243,388

(22) Filed: Oct. 4, 2005

(65) Prior Publication Data

US 2007/0078970 A1  Apr. 5, 2007

(51) Int. Cl.
*G06F 15/173* (2006.01)
(52) U.S. Cl. ..................................... 709/223
(58) Field of Classification Search .......... 709/223–225
See application file for complete search history.

(56) References Cited

U.S. PATENT DOCUMENTS

| | | | |
|---|---|---|---|
| 6,286,047 B1 | 9/2001 | Ramanathan et al. | |
| 7,249,189 B2 * | 7/2007 | Refai et al. | 709/230 |
| 2002/0055996 A1 * | 5/2002 | Sugauchi et al. | 709/223 |
| 2002/0113816 A1 | 8/2002 | Mitchell et al. | |
| 2004/0059811 A1 * | 3/2004 | Sugauchi et al. | 709/224 |
| 2004/0139193 A1 * | 7/2004 | Refai et al. | 709/224 |
| 2004/0196794 A1 * | 10/2004 | Fu | 370/254 |
| 2005/0198250 A1 * | 9/2005 | Wang | 709/223 |

FOREIGN PATENT DOCUMENTS

| | | |
|---|---|---|
| EP | 1 585 256 | 10/2005 |
| WO | WO 97/23831 | 7/1997 |

* cited by examiner

*Primary Examiner*—Larry D Donaghue

(57) ABSTRACT

Techniques for managing tiered communication services in a composite communication service are disclosed. Component communication services for providing a composite communication service are arranged into tiers in a structure of the composite communication service. The tiers and order facilitate visualization of composite communication services and assessment of the effects of events which impact a portion of a composite communication service on other portions of the composite communication service, for example. Related data structures and user interfaces are also disclosed.

13 Claims, 13 Drawing Sheets

Service Owner
ID: 5  [View] ~113
Name: Financiere X Financial

112 { above }

Composite Service
Composite ID: 1002  [View] ~115
Name: Banco-X
Aggregated Operational State: Partial Down 114 { above }

116 — Service ID: 1004
118 — Service Name: Toronto Centre
120 — Decription: N/A
122 — Administrative State: Up ▼
124 — Operational State: Down 126 — Status Cause:
- ☐ Service MTU Mismatch  ☑ Missing Binding(s)
- ☑ Site(s) Down  ☐ Binding(s) Down

[Remove] 134  [Topology View] 136

[Resync] 132  [Reset] 133  [OK] 135  [Cancel] 137  [Apply] 139

| Composite Service Identifier 372 | Component Service 1 Identifier 374 | ... | Component Service n Identifier 376 | Other Information 378 |

| Connector Identifier 382 | Connector Type 383 | Composite Service Identifier 384 | Connector Endpoint 1 Identifier 386 | ... | Connector Endpoint m Identifier 388 | Other Information 389 |

| Service Identifier 392 | Composite Service Identifier 394 | Composite Service Tier 396 | Other Information 398 |

MANAGEMENT OF TIERED COMMUNICATION SERVICES IN A COMPOSITE COMMUNICATION SERVICE

CROSS-REFERENCE TO RELATED APPLICATIONS

This application is related to U.S. patent applications Ser. No. 11/243,196, entitled "COMMUNICATION SYSTEM HIERARCHICAL TESTING SYSTEMS AND METHODS—ENTITY DEPENDENT AUTOMATIC SELECTION OF TESTS", and Ser. No. 11/243,005, entitled "COMPOSITE COMMUNICATION SERVICE MANAGEMENT", both filed of even date herewith and assigned to the Assignee of the present application. The entire contents of each of these related applications are incorporated herein by reference.

FIELD OF THE INVENTION

This invention relates generally to communications and, in particular, to composite communication services provided by multiple component communication services supported in a communication system.

BACKGROUND

Current communication network and service management systems only handle individual services, such as VLAN (Virtual Local Area Network), VPLS (Virtual Private LAN Service), MPLS/BGP VPN (Multi-Protocol Label Switching/Border Gateway Protocol Virtual Private Network), also sometimes referred to Layer 3 VPN or VPRN (Virtual Private Routed Network), PW (pseudo-wire), and so on. Although these current management solutions may be suitable for simple VPNs using a single technology, complex applications to provide so-called "triple play" services, for instance, typically involve service providers having their services span over multiple management domains and/or technologies.

Even with service grouping, it is still difficult to define the effects of problems in one or more services on others of the same group, since conventional management systems do not provide a complete view of interconnections between communication services. Problems in an "upstream" service could affect some or all "downstream" services, depending on redundancy configurations in the service provider network, though the extent to which problems can propagate between connected services cannot easily be determined using conventional network management techniques and systems. A management system for a communication network, for example, might be aware of connectivity between individual service sites which support a communication service, but does not take into account the connectivity from all sites of a given service to others as a whole.

In addition, existing network/service management systems do not provide any form of inter-service correlation in terms of monitoring, diagnostics, or service assurance.

Thus, there remains a need for improved techniques for representing composite communication services and diagnosing events affecting such services.

SUMMARY OF THE INVENTION

Some embodiments of the invention are directed to the problem of efficiently diagnosing a composite communication service and displaying its topology. In one implementation, the techniques disclosed herein are used in conjunction with multiple services in a communication system, such as VPLS, MPLS/BGP VPN, VLAN, and pseudo-wire, among others, when they are used in combination to provide a subscriber service such as a triple play service. Connection of communication services together, different views of grouped/connected communication services for providing a composite communication service, and aggregation of alarms from individual services are disclosed in the present application and in the related applications referenced above.

Techniques are provided for determining which of the component communication services that provide a composite communication service are affected when problems occur in one or more other component communication services of the composite communication service. This is accomplished in one embodiment using a tiered service approach. A composite communication service is structured into tiers or hierarchical levels, and each component communication service of the composite communication service is grouped into a tier. Component communication services of the same tier of a composite communication service can be displayed, for example, at the same vertical coordinate on a display screen. The operational status of each component communication service and connections between component communication services may also be displayed, to thereby provide a representation, illustratively a tree-like composite communication service topology, which allows network/service operators to visualize effects of service problems such as failures or service degradation, or other events.

According to an aspect of the invention, there is provided a system which includes a composite communication service detector and a composite communication service manager. The composite communication service detector is adapted to detect a plurality of communication services, supported in a communication system, for providing a composite communication service. The composite communication service manager is operatively coupled to the detector and adapted to determine for each detected communication service an associated communication service tier in a structure of the composite communication service. The composite communication service includes a plurality of communication service tiers having an order in the structure. The composite communication service manager is also adapted to provide a representation of the composite communication service which includes an indication of each detected communication service and the tier order.

The manager may determine the communication service tier for a detected communication service by determining the communication service tier of the plurality of communication service tiers to which a detected communication service has been assigned, and/or by determining that a detected communication service has been newly added to the composite communication service and assigning the added communication service to a communication service tier of the plurality of communication service tiers.

The plurality of communication service tiers may include tiers associated with respective sets of one or more types of communication service.

At least some communication services of the plurality of communication services may be configured for operation with each other to provide the composite communication service by one or more service connectors, each of which specifies a logical association between communication services. In this case, the detector may be further adapted to detect a service connector of the composite communication service, and the representation may also include an indication of the detected service connector.

In some embodiments, the manager is further adapted to determine an extent to which an event directly affecting a portion of the composite communication service affects other portions of the composite communication service through any detected service connectors, and to include in the representation an indication of one or more of: the event, the directly affected portion of the composite communication service, and whether the event affects the other portions of the composite communication service.

The manager may be further adapted to determine whether a communication service in a communication service tier is affected by the event directly or through a service connector to a communication service in another communication service tier. If the communication service is affected by the event through a service connector, the manager may determine whether the composite communication service includes a redundant service connector associating the communication service in the communication service tier with a communication service in the other communication service tier through a portion of the composite communication service which is not affected by the event. The manager may also identify the communication service in the communication service tier as an affected communication service if the communication service is directly affected by the event, or the communication service is affected by the event through a service connector and the composite communication service does not include a redundant service connector associating the communication service with a communication service in the other communication service tier through a portion of the composite communication service which is not affected by the event.

According to another embodiment, the manager is adapted to detect as a redundant service connector one or more of a service connector associating the communication service in the communication service with another communication service in the communication service tier which is associated by a further service connector with a communication service in the other communication service tier through a portion of the composite communication service which is not affected by the event, and a service connector associating the communication service in the communication service tier with another communication service in the other communication service tier.

The manager may determine whether an identified affected communication service is associated with another communication service of the composite communication service by a service connector, and if so, determine whether the other communication service is an affected communication service.

In some embodiments, the manager is further adapted to include in the representation an indication of an effect of the event on one or more of: a communication service directly affected by the event, a service connector directly affected by the event, a communication service affected by the event through one or more service connectors, and a service connector associating a communication service that is affected by the event, directly or through one or more service connectors, with another communication service.

A method is also provided, and includes defining a plurality of communication service tiers to include communication services, supported in a communication system, for providing a composite communication service, each communication service tier of the plurality of communication service tiers having a set of one or more criteria for assignment of communication services to the communication service tier, and defining a relative order of the plurality of communication service tiers in a structure of the composite communication service.

The criteria may include criteria based on one or more of: a communication service type, a communication service tier of another communication service with which a communication service has been configured for operation, and an input specifying a communication service tier of the plurality of communication service tiers.

An effect of an event on the composite communication service may be determined on the basis of any or all of: relationships between communication services of the composite communication service, a type of a communication service of the composite communication service, a topology of the composite communication service, and a topology of a communication service of the composite communication service.

The above operations may be performed in any of various ways, and methods according to other embodiments may include additional operations. Some of these variations have been briefly described above.

According to another aspect of the invention, a data structure is provided, and includes information identifying a plurality of communication services, supported in a communication system, for providing a composite communication service, and information indicating respective communication service tiers, of a plurality of communication service tiers arranged in an order to define a structure of the composite communication service, to which each of the plurality of communication services has been assigned.

The data structure may include a plurality of communication service data records, each data record including information identifying a communication service of the plurality of communication services, and information indicating a communication service tier of the plurality of communication service tiers to which the communication service has been assigned.

A user interface is also provided, and includes respective visual elements representing a plurality of communication services for providing a composite communication service in a communication system, each visual element being displayed at a position, relative to other visual elements, indicative of a communication service tier to which the communication service represented by the visual element has been assigned and an order of the communication service tiers in a structure of the composite communication service.

The user interface may also include one or more of: respective visual elements representing logical associations, if any, between communication services of the plurality communication services, indications of operational states of the plurality of communication services, indications of operational states of interconnections between communication services of the plurality of communication services, and indications of events affecting the composite communication service.

Visual elements representing communication services assigned to a communication service tier of the plurality of communication service tiers may be displayed along a common vertical level on a display screen.

Moving of a visual element from a current vertical level may be allowed or blocked. A user input received through the user interface to move a visual element from a current vertical level may cause the communication service represented by the visual element to be reassigned to a different communication service tier when moving of the visual element from a current vertical level is allowed.

Other aspects and features of embodiments of the present invention will become apparent to those ordinarily skilled in the art upon review of the following description.

BRIEF DESCRIPTION OF THE DRAWINGS

Examples of embodiments of the invention will now be described in greater detail with reference to the accompanying drawings, in which:

FIG. 6 is a block diagram of a component communication service UI;

FIG. 14 is a block diagram of a data structure representing a composite communication service;

FIG. 15 is a block diagram of a data structure representing a service connector; and FIG. 16 is a block diagram of a data structure representing a component communication service.

DETAILED DESCRIPTION OF PREFERRED EMBODIMENTS

Figure 1:
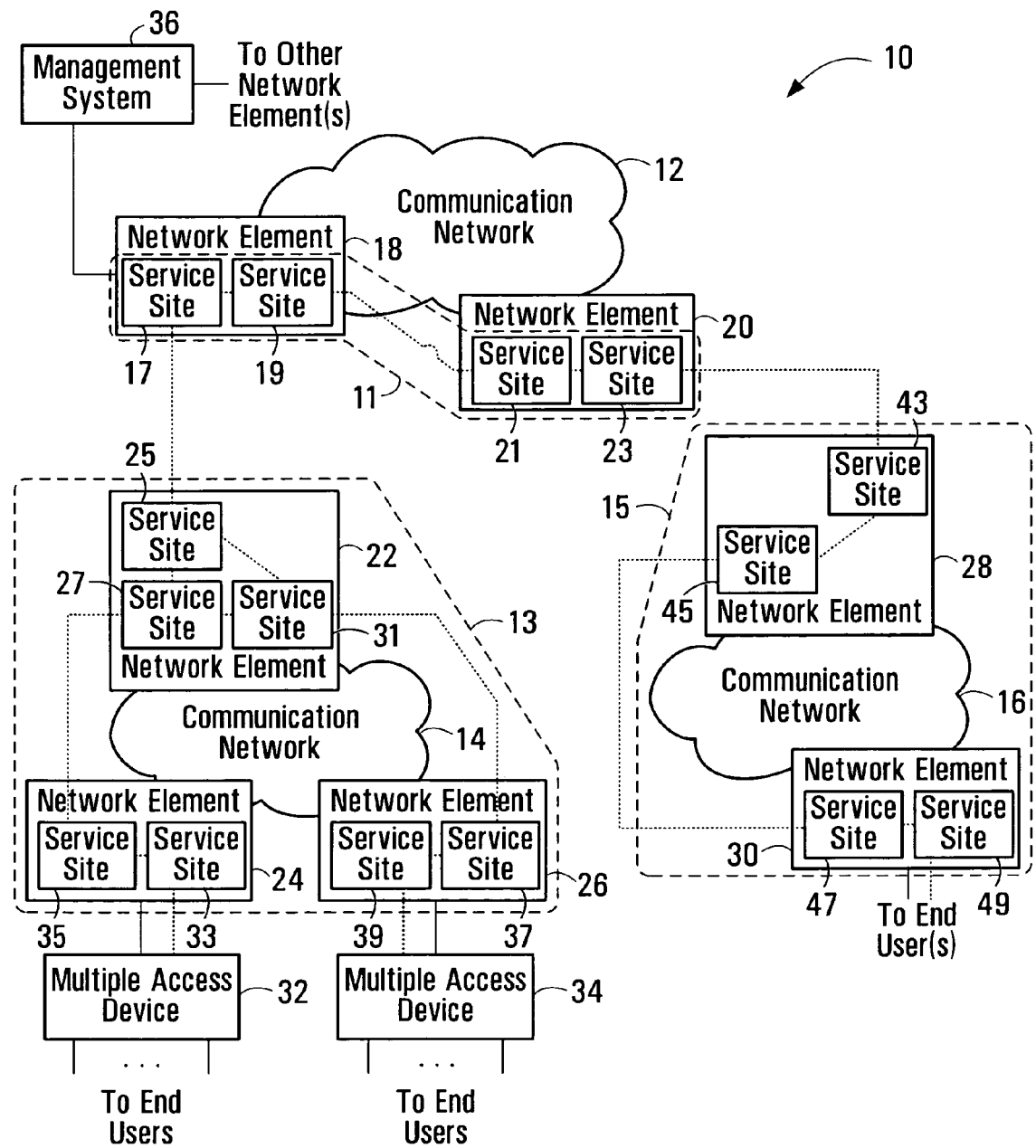
FIG. 1 is a block diagram of a communication system.

FIG. 1 is a block diagram of a communication system. The communication system 10 includes multiple communication networks 12, 14, 16 having network elements 18, 20, 22, 24, 26, 28, 30. The network elements 24, 26 of the communication network 14 are operatively coupled to multiple access devices 32, 34 which provide access to the communication network 14 for end users. Any or all of the network elements 18, 20, 22, 24, 26, 28, 30 may be managed by a management system 36.

Communication systems may have many different topologies, including more or fewer communication networks having similar or different equipment than shown in FIG. 1. For example, different communication networks may use different access schemes. As shown, end users access the communication network 14 through multiple access devices 32, 34, whereas more direct end user access is provided to the communication network 16 through the network element 30. It should therefore be appreciated that the system of FIG. 1, as well as the contents of the other drawings, are intended solely for illustrative purposes, and that the present invention is in no way limited to the particular example embodiments explicitly shown in the drawings and described herein.

Switches and routers are illustrative of the types of communication equipment represented by the network elements 18, 20, 22, 24, 26, 28, 30. The communication networks 12, 14, 16, in addition to the border or edge network elements explicitly shown in FIG. 1, may also include intermediate network elements which route communication traffic through the communication networks 12, 14, 16. Any or all of the communication networks 12, 14, 16 may thus include edge, core, and/or other types of communication equipment. In other embodiments, the techniques disclosed herein are used in conjunction with communication equipment which might not necessarily be connected in a network. References to communication equipment and connections should thus be interpreted accordingly.

Functions for managing the communication networks 12, 14, 16, to configure connections and services, control communication equipment, and/or monitor network operations for instance, may be provided by the management system 36. Although shown as a single component in FIG. 1, multiple management systems may be implemented where communication equipment is operated by different entities. An example of a management system is described in detail below with reference to FIG. 3. Other management or control equipment, such as local operator terminals, may also be provided in any or all of the communication networks 12, 14, 16.

The multiple access devices 32, 34 distribute communication traffic to and/or receive communication traffic from end user equipment, such as computer systems, by which communication traffic is generated and transmitted and/or received and terminated. Where connections to end users are DSL (Digital Subscriber Line) connections, for example, the multiple access devices 32, 34 may be DSLAMs (DSL Access Multiplexers). Customer edge routers and other customer premises equipment are further examples of the multiple access devices 32, 34.

Many different types of network, access, and end user communication equipment, as well as the operation thereof, will be apparent to those skilled in the art. In general, communication traffic is transferred between sources and destinations, possibly through one or more of the communication networks 12, 14, 16. Traffic may be translated between different protocols or formats during its transfer. As discussed in further detail herein, the transfer of communication traffic may involve multiple communication services supported in the communication system 10, and illustratively communication services supported in the different communication networks 12, 14, 16, which have been configured to cooperate to provide a composite communication service.

In one particular example embodiment, traffic is routed in the communication network 12 using IP (Internet Protocol) or MPLS, the communication networks 14, 16 are Ethernet networks, and the multiple access devices 32, 34 are DSLAMs.

However, it should be appreciated that embodiments of the invention are not limited to any particular types of communication equipment, transfer mechanisms, or protocols. Those skilled in the art will be familiar with various communication system implementations and services in conjunction with which embodiments of the invention may be used. It is also contemplated that embodiments of the invention may be applicable to communication systems and services which are subsequently developed.

Communication services 11, 13, 15 are also shown in FIG. 1, in the form of service sites and interconnections therebetween. The communication services 11, 13, 15 are supported by communication equipment in the communication networks 12, 14, 16, in that these services transfer data through the communication equipment and physical connections between that equipment. However, the communication networks and their elements might not have any type of service "awareness". For example, a network element would not normally know the complete topology of a communication service which has been set up by provisioning service sites at that network element. Moreover, communication equipment generally cannot distinguish a connection between service sites of the same communication service from a connection between service sites of different communication services. Clearly, communication equipment would normally be completely unaware when an SAP (Service Access Point) of one of its service sites, through which a communication service is accessible, is actually hooked up to an SAP of another service site for a different communication service via a cable, for example.

Consider an example scenario in which the whole system 10 under the management of the management system 36, illustratively an NSM (Network and Service Management system) through which both communication equipment and services can be configured and managed. The management system 36 can be used to provision service sites in any of its managed network elements, which includes all of the network elements 18, 20, 22, 24, 26, 28 in this example.

As shown in FIG. 1, the service sites 17, 19, 21, 23 are provisioned in the network elements 18, 20 and interconnected to set up a communication service 11 in the communication network 12, the service sites 25, 27, 31, 33, 35, 37, 39 are provisioned in the network elements 22, 24, 26 and interconnected to provide a communication service 13 in the communication network 14, and the service sites 43, 45, 47, 49 are provisioned in the network elements 28, 30 and interconnected to provide another communication service 15 in the communication network 16. Some of these service sites, specifically the service sites 17/25, 23/43, are connected between different services to establish a composite communication service which uses all of the individual communication services 11, 13, 15. Of course, other types of service site and communication service arrangements are also possible.

In the context of a composite communication service which encompasses all of the communication services 11, 13, 15, the network elements 18, 20, 22, 24, 26, 28 in the communication networks 12, 14, 16 may be considered a portion of an overall service provider network.

The relationship between actual equipment and communication services will be apparent to those skilled in the art from FIG. 1. Communication services effectively overlay the communication equipment. For example, connections between the network elements 18/22, 20/28 may be physical links, whereas logical connections between the service sites 17/25, 23/43, shown in dashed lines in FIG. 1, allow data transfer between service sites over the physical links.

Figure 2:
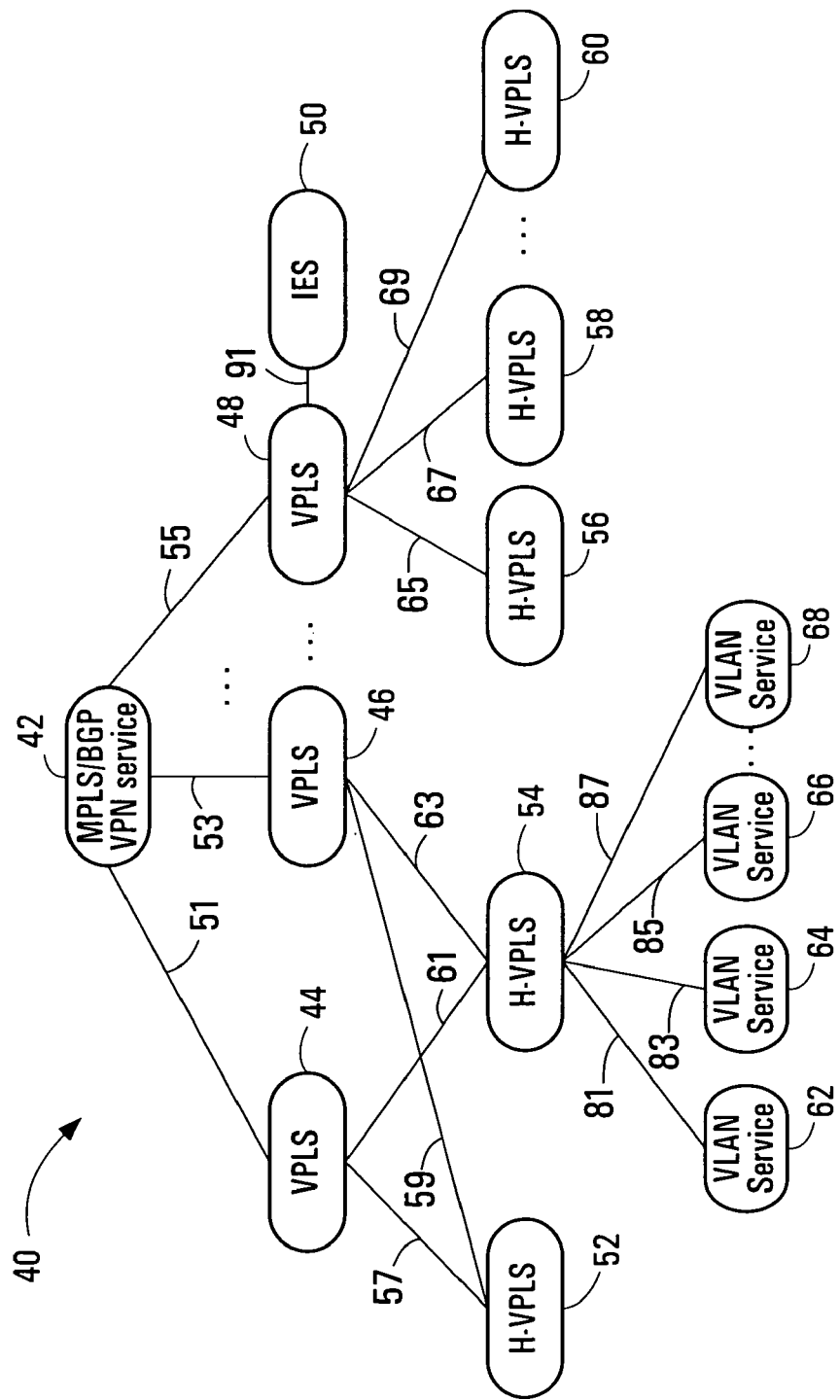
FIG. 2 is a block diagram illustrating component communication services involved in providing a composite communication service.

FIG. 2 is a block diagram illustrating component communication services involved in providing a composite communication service. In FIG. 2, a composite communication service 40 is provided by multiple component communication services of different technologies, including an MPLS/BGP VPN service 42, VPLSs 44, 46, 48, an IES (Internet Enhanced Service) 50, H-VPLSs (Hierarchical VPLSs) 52, 54, 56, 58, 60, and VLAN services 62, 64, 66, 68. Also shown in FIG. 2 are service connectors 51, 53, 55, 57, 59, 61, 63, 65, 67, 69, 81, 83, 85, 87, 91, which represent operative connections between communication services. Other composite communication services may include fewer, further, or different component communication services than those shown.

A component communication service, also referred to herein as a communication service or component communication service, may be configured to provide a composite communication service. In some embodiments, a component communication service is configured to operate with other component communication service to provide a composite communication service. Illustrative examples of component communication services include the services shown in FIG. 2, with which those skilled in the art will be familiar.

The blocks shown in FIG. 2 provide a service-level view, as opposed to the combined equipment- and service-level view of FIG. 1, of a composite communication service. In terms of implementation, a VPLS, for example, might consist of one or more VPLS service sites operatively coupled to each other. A service site represents a service object in a network element, such as a VLL (Virtual Leased Line) service site or a VRF (Virtual Routing and Forwarding) service site of an MPLS/BGP VPN, or a VLAN object, for instance. A service may include multiple service sites. A VLL service site or a VPLS service site of a VPLS service can be operatively coupled or "connected" to one or more service sites of another VPLS service.

Those skilled in the art will be familiar with MPLS/BGP VPN, VPLS, H-VPLS, and VLAN services as shown in FIG. 2.

According to embodiments of the invention, tools are provided to help monitor, visualize, and quickly diagnose the health of a composite communication service and/or its component communication services/connections, illustratively in any geographical areas of the service network. Using conventional management systems and techniques, it is very difficult and time consuming to identify troublesome areas, since a particular communication service which is affected by an event occurring outside the service may appear to be healthy from an individual service point of view.

In one embodiment, a composite communication service is defined and managed hierarchically. Component communication services for providing a composite communication service are classified into tiers or levels. The tiers have a specific order in the composite communication service, and thus a composite communication service may have a hierarchical structure. Component communication services assigned to the same tier are at the same level in a structure of a composite communication service. In one possible composite communication service structure, component communication services in a higher order tier are supported closer to a network core compared to lower tier communication services. With reference to FIG. 2, the MPLS/BGP VPN service 42 is at a highest tier in the structure of the composite communication service 40 and operates with the VPLS services 44, 46, 48, at the next lower tier.

Communication service tiers and order may be taken into account for representing a composite communication service in a display. For example, the component communication services in one tier could be displayed as a "row" in a representation of the composite communication service. Another possible use of communication service tiers and order would be to monitor and/or diagnose a composite communication service to assess the exact overall effects of a component communication service problem or other event on the composite communication service.

Considering a video/TV broadcast application for example, the MPLS/BGP VPN 42 may use PIM (Protocol Independent Multicast) and IGMP (Internet Group Management Protocol) to distribute TV channels to various metro Ethernets, shown in FIG. 2 as the VPLSs 44, 46, 48. Traffic is further broadcast to different areas of each city using H-VPLSs 52, 54, 56, 58, 60. Low cost L2 switches or DSLAMs could be used at the last mile to implement the VLAN services 62, 64, 66, 68 in different ring groups or in different DSLAMs, for delivery of TV content to subscribers of the composite TV service.

The component communication services of the composite communication service 40 are operatively coupled to each other using service connectors, represented in FIG. 2 at 51, 53, 55, 57, 59, 61, 63, 65, 67, 69, 81, 83, 85, 87, 91. Each service connector shown in FIG. 2 represents a logical link between two component communication services.

Different types of service connector may be employed to operatively couple the services together to provide the composite TV service. For example, interface to interface service connectors may be used between the VLAN services 62, 64, 66, 68 and the H-VPLS 54, and also between the MPLS/BGP VPN service 42 and the VPLSs 44, 46, 48. PW connectors may be used both to interconnect "satellite" H-VPLSs 52, 54, 56, 58, 60 and the VPLSs 44, 48. Another type of service connector, referred to herein as a cross-connect, may be used between services having service sites located in the same communication equipment, such as the VPLS 48 and the IES 50.

As will be apparent from the foregoing, a composite communication service is basically a set of communication services, supported in a communication system, some of which may have been configured to operate together. Service connectors are used in some embodiments to configure the communication services to operate together so as to provide the composite communication service.

The composite communication service 40 represented in FIG. 2, for instance, involves MPLS/BGP VPN, VPLS, H-VPLS, and VLAN technologies and interconnections between those technologies. Management of these interconnections using conventional management systems is difficult in that network operators or other management personnel could not easily identify relationships between communication services. A management system may provide a representation of a composite communication service in which relationships between a communication service, a composite communication service, and any other communication services configured as part of the composite communication service, are clearly indicated.

As noted above, although a composite communication service and its component communication service(s) are supported by equipment in a communication system, the concept of a composite communication service itself may be unknown to the communication system, outside of a management system used to manage equipment and services of the communication system. Thus, the ability to manage composite communication services need not be disrupted by changes in the communication system. For instance, rules may be established for composite communication service creation, deletion, modification, and/or presentation. These rules can be enforced at the management system to prevent improper service connections from being added or to alert service management personnel to changes that have been made to the communication system in the field and affect a composite communication service, for instance. In the latter case, management personnel may then take appropriate action, to modify component communication services and/or connectors of the affected communication service. An improper connector may reflect incorrect configuration of component communication services, for example, which can be remedied by changing how the component communication services have been configured to operate with each other.

Despite the challenges of managing composite communication services, it may in many instances be desirable to configure multiple communication services, within or beyond the scope of a managed communication network or portion of a communication system, to provide a composite communication service. The component communication services may be of similar or different types.

Multiple VLAN services on different bridged networks, for example, could be connected to an H-VPLS. The VLAN service and the H-VPLS can be configured for operation with each other by creating an SCP (Service Connection Point) to SCP service connector using a management system. An SCP to SCP service connector is one type of service connector according to an embodiment of the invention, which may be used to configure component communication services to provide a composite communication service. SCP to SCP service connectors may also be used to configure other types of communication service than VLAN and H-VPLS, such as to connect VPLSs to a MPLS/BGP VPN service as shown in FIG. 2, or vice versa.

An SCP to SCP connector specifies a logical link between two SCPs. An SCP is a service interface through which a communication service is accessible at a service provider "side" of a service, as opposed to a user or subscriber side of the service which is accessible through an SAP. In relation to the physical communication system, the SCP to SCP logical link could run over a cable such as an Ethernet cable or over a network using FR (Frame Relay) or ATM (Asynchronous Transfer Mode), for instance.

As another example, it may be desired to provide a private data service with high speed Internet access. Such a private data service could be provided by bridging multiple L2 service sites, which provide L2 data services, via a VPLS instance. This could be achieved by SCP to SCP connectors described above, or through other types of service connector, including PW spoke connectors or, where the services which are to provide the composite private data service are supported on the same communication equipment, configurable cross-connectors.

PW spoke connections in a communication system may be used to create H-VPLS services, or to connect an IES and a VPLS. In one embodiment, a PW spoke is established by logically binding a communication service to a communication path. Where traffic in a binding is unidirectional, from the service to a communication tunnel for instance, a binding may be created at each endpoint service site to support bidirectional communications between services.

In some cases, multiple communication services may be may be supported on the same piece of equipment. For example, a single service router may incorporate multiple SAPs. Physical connections between such services could be made through a local cable connection or a configurable connection device, for instance. Whereas a cable would generally be installed between communication equipment ports or interfaces after deployment of communication equipment, when inter-SAP connections are to be established, a configurable connection device could be pre-installed on an equipment backplane, for example, and subsequently configured, from a management system at a remote location for instance, to connect equipment ports/interfaces.

It is expected that physical connections between communication equipment in the communication system, through which logical connections between communication services are established, will be either installed or already in place before communication services are configured to operate together to provide a composite communication service. If necessary, new physical connections may be installed to support inter-operation between services. Once any required physical connections have been installed or configured, as in the case of a configurable connection device for instance, composite communication service configuration may proceed.

Configuration of communication services and configuration of service connectors may be performed separately or effectively as part of the same process. A management system, for example, may provide multiple interfaces for managing communication services. The same communication equipment and services may be controlled through a CLI (Command Line Interface), an OSSI (Operation Support System Interface), and also through a GUI (Graphical User Interface) for instance. A composite communication service could be set up by entering a name for the composite communication service, specifying component communication services related to the composite communication service, and configuring service connectors to create logical associations or relationships between the component communication services. Actual configuration of the communication system to implement the logical associations specified in the service connectors may then be performed either manually, such as through the CLI, OSSI, or GUI, or automatically by the management system. The latter approach may generally be preferred, in that the entire composite communication service is then manageable as a single entity. Separate tasks for configuring each of the component communication services are then avoided.

Regardless of the configuration method, manual or automatic, a composite service may thereafter be managed as a single entity.

In one embodiment, the actual configuration of a composite communication service in the communication system involves causing equipment at the endpoints of a communication tunnel to exchange control signalling to set up unidirectional service to tunnel bindings in opposite directions so as to enable bidirectional communication between services through the tunnel.

Accordingly, although the communication system itself might not be "aware" of the concept of a composite communication service, management of a composite communication service through its component communication services and/or service connectors may have an effect on configuration of equipment and services in the network.

In a similar manner, communication system configurations which affect a composite communication service may be automatically detected and reflected at a management system. Configuration of two communication services to operate together may be detected and reflected in a composite communication service management GUI, for example. This aspect of the present invention is described in further detail below.

Figure 3:
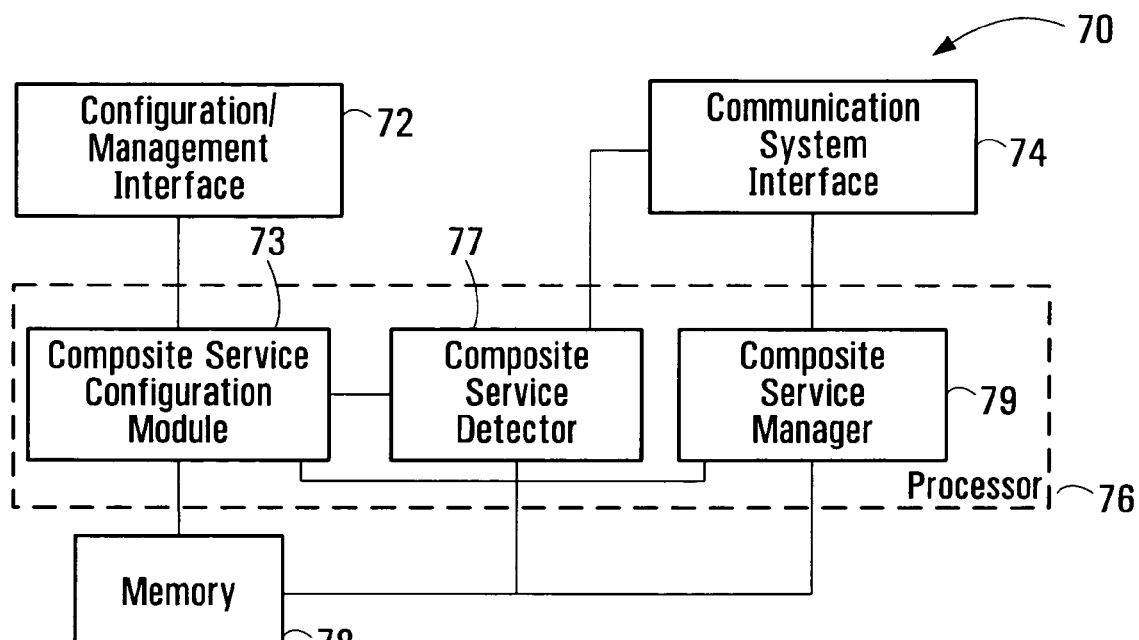
FIG. 3 is a block diagram of a composite communication service management system.

These and other functions which may be provided in embodiments of the invention will be appreciated from the following description of FIG. 3, which is a block diagram of a composite communication service management system.

FIG. 3 shows an illustrative example management system 70, which includes a configuration/management interface 72, a composite service configuration module 73 operatively coupled to the configuration/management interface 72, a composite service detector 77 operatively coupled to the composite service configuration module 73, a composite service manager 79 operatively coupled to the composite service configuration module 73, a communication system interface 74 operatively coupled to the composite service detector 77 and to the composite service manager 79, and a memory 78 operatively coupled to the composite service configuration module 73, to the composite service detector 77, and to the composite service manager 79. As shown, the composite service configuration module 73, detector 77, and manager 79 may be implemented using a processor 76, although the invention is in no way limited to this particular type of implementation.

A composite communication service management system may be implemented as part of an overall management solution for a communication system, and may thus operate in conjunction with other components and functions not explicitly shown in FIG. 3. Accordingly, embodiments of the invention may include further, fewer, and/or different components which are operatively coupled in a similar or different manner than shown. In addition, the particular division of functions shown in FIG. 3 is also intended only for illustrative purposes. The functions of the configuration module 73, the detector 77, and the manager 79 may be provided in more than three components or modules, or in a single component or module, in other embodiments.

The types of the interconnections between components of FIG. 3 will be, at least to some extent, implementation-dependent. Where the components of the system 70 are implemented in hardware, the interconnections may be provided through physical connectors such as a computer system bus. In some embodiments, at least the composite service configuration module 73, the composite service detector 77, and the composite service manager 79 are implemented in software for execution by the processor 76. In this case, the operative coupling between these components may instead be logical. For example, the composite service configuration module 73, the composite service detector 77, and the composite service manager 79 may access the same data structures in the memory 78, whereby the data structures represent a logical operative connection between the module 73, the detector 77, and the manager 79.

The configuration/management interface 72 may include one or more devices for receiving inputs from and/or providing outputs to a user. For example, a user may perform composite communication service management functions by entering or selecting information using a keyboard and mouse, and management of composite communication services may be simplified by information presented to the user on a display. The configuration/management interface 72 may support any or all of an OSSI for receiving commands such as composite communication service creation commands and/or other inputs from another system, and a GUI, for instance. Support for an OSSI may be provided using an interface such as an Application Programming Interface, for example, to allow external systems to interact with the management system 150.

In perhaps most implementations of embodiments of the invention, the management system 70 will communicate with the communication system in which a composite communication service is to be provided. The communication system interface 74 includes a transmitter, a receiver, or both, in the form of a transceiver for instance, to enable such communications.

As noted above, the management system 70 may send control signals to communication equipment in the communication system to configure the equipment and/or communication services which are supported by the equipment so as to provide a composite communication service. Another function which may be provided is automatic discovery of composite communication services based on configurations of communication equipment in a communication system. To this end, configuration information associated with equipment and/or services in the communication system may be received by the management system 70 through the communication system interface 74, during a synchronization operation through which communication system configurations are reconciled with central system management records, for example.

Those skilled in the art will appreciate that the specific structure and operation of the communication system interface 74 is dependent upon the particular communication system and equipment with which the management system 70 is to communicate, the media and protocols used between the management system 70 and the communication system, and whether the management system 70 is to transmit, receive, or both transmit information to and receive information from the communication system.

The composite service configuration module 73, the composite service detector 77, and the composite service manager 79 may each be implemented in hardware, in software for execution by a processor 76, such as a microprocessor, an ASIC (Application Specific Integrated Circuit), an FPGA (Field Programmable Gate Array), or other type of processing element, or in some combination of hardware and software. Although a single processor 76 is shown in FIG. 3, multi-processor implementations are also contemplated, in which any or all of the module 73, the detector 77, and the manager 79 are implemented using more than one processing element. The other components of the management system 70 may similarly be implemented partially or entirely using hardware or software.

The memory 78 may include one or more memory devices of the same or different types. Solid state memory devices and devices for use with movable and/or removable storage media are illustrative of types of memory device which the memory 78 may include. It should also be appreciated that the memory 78 may be local to the management system 70 as shown, or a remote store at a server, for example, which is accessible by a management system. In one embodiment, the memory 78 is used to implement a database system.

In operation, the composite service detector 77 detects that a composite communication service, to be provided by one or more communication services supported in a communication system, has been defined. This composite service detection by the detector 77 may be based on inputs received by the composite communication system configuration module 73 through the configuration/management interface 72, information received through the communication system interface 74, or both.

As noted briefly above, a user may invoke a function to define a new composite communication service and enter information such as a name and possibly other information associated with the new composite communication service. In one embodiment, this function is invoked by clicking on a button or menu item in a UI presented to a user in the configuration/management interface 72. These inputs are received by the configuration module 73, and the detector 77 then detects that a composite communication service has been defined based on the user inputs.

Component communication services may similarly be configured by a user when the composite communication service is created or at a later time. In this case, configuration of a communication service to provide the composite communication service can also be detected by the detector 77 based on the user inputs. Service connectors, such as the types noted above, may also be added by a user and detected by the detector 77 where multiple communication services are involved in providing a composite communication service.

It is also possible that a user may remove service connectors and/or component communication services from a composite communication service.

Thus, a composite communication service might include zero or more component communication services. Some or all of the component communication services may be configured to cooperate to provide the composite communication service by adding service connectors.

The composite communication service manager 79 provides a representation of the composite communication service. The representation may be in the form of a visual representation displayed to a user through the configuration/management interface 72. A representation may also or instead be provided by storing data records in the memory 78.

Management of a composite communication service is simplified by including in the representation an indication of whether a component communication service has been configured to provide the composite communication service. A visual representation, for example, may include a representation of a composite communication service such as the name of the composite communication service, and a representation of any or all component communication services of the composite communication service, illustratively as respective icons. In this case, when a user chooses to view details of a composite communication service, it can easily be determined whether any component communication services have been configured to provide the composite communication service. If a component communication service icon is displayed, then a user knows that the component communication service has some sort of relationship with the composite communication service.

In a stored representation, data stored in the memory 78 explicitly indicates relationships between a composite communication service and its component communication services.

The composite service manager 79 may provide subsequent access to the representation so as to allow a user to perform management functions for the composite communication service through the configuration module 73. Management functions may include configuring a communication service supported by the communication system to provide the composite communication service, removing a communication service from the composite communication service, deleting the composite communication service, and/or other functions through which a composite communication service may be modified. Modification of a composite communication service may also be detected by the detector 77 and reflected in the representation provided by the manager 79.

The composite service manager 79 may also determine whether component communication services have been properly configured in the communication system. Control signals may then be sent to the communication system through the communication system interface 74 to configure the component communication services. This may involve communicating with communication equipment to cause the equipment to establish bindings between services and a communication tunnel for instance.

Turning now to the feature of detection of a composite communication service based on configurations in the communication system, configuration information associated with a communication service supported in the communication system may be received by the management system 70 through the communication interface 74, as noted above. The detector 77 receives this configuration information either directly from the interface 74 or through the memory 78. The configuration information might be received and stored to the memory 78 by the composite service manager 79 and then accessed and analyzed by the composite service detector 77 to determine whether a communication service has been configured for operation with another communication service to provide a composite communication service.

In some embodiments, this function of the detector 77 is accomplished by discovering configurations which reflect management system service connectors. Connectivity among services provisioned in communication equipment, regardless of equipment type/version or service types, can thus be determined by the detector 77. Any affected composite communication services are then updated accordingly by the manager 79. New composite communication services can also be formed due to newly discovered relationships between services. The manager 79 may also enforce connection and connector rules and raise alarms and/or undertake other courses of action based on those rules.

The detector 77 may be adapted to detect any of the connector types described above, for example, and corresponding configurations of services in a communication system. SCP to SCP connectors specify a logical link between service interfaces, which in some embodiments may represent basically an SAP to SAP connector. For L2 switches, the an SCP to SCP connector could have one end from an uplink (a network interface) to a SAP. Based on L1/L2 (cable, LAG (Logical Aggregation Group), APS (Automated Protection Switch)) connectivity, and the channels (for SONET/SDH) and encapsulation types and values, for example, a connection between two SCPs can be formed to create or modify a composite communication service, and later detected by the detector 77. Two SAPs with QinQ encapsulation and the same outer/inner values on the ends of the physical links could be detected by the detector 77 as having been configured with a valid inter-service connection. A new SCP to SCP connector may then be automatically created at the management system 70.

Internal cross connections between communication services supported by the same piece of communication equipment, illustratively through a configurable connection device, can be discovered during scheduled resynchronization of the communication equipment or via network events (i.e., traps) from the communication equipment.

The discovery of PW spoke connections may involve matching of VC (Virtual Circuit) identifiers used at end service sites on different communication equipment. This process can also be performed at resynchronization time, or upon receiving network events from the communication equipment.

The detector 77 may also distinguish between different types of service site interconnections. For example, two connected service sites may be associated with the same or different communication services. From a service-level point of view, service connectors which represent connections between different communication services may be of most interest. Accordingly, the detector 77 could be configured to detect multiple types of connection, but to add service connectors representing only those detected connections which connect service sites of different services to a composite communication service.

It is important to note that the detector 77 may detect composite communication services by discovering actual configurations in the communication system, as reflected in configuration information received from the communication system, or by discovering service connectors established at the management system 70. In the former situation, service connectors corresponding to discovered configurations can be automatically added at the management system 70. This may be useful for the purposes of backward compatibility, where a composite communication service management system 70 is deployed in conjunction with a communication system which had formerly been managed using a conventional management system.

The latter example noted above involves discovery of service connectors which already exist at the management system. This situation might arise where a new connection between service sites of two services is created. Service provider personnel configuring a new connection via a CLI or OSSI, for example, might forget to later create a service connector representing the new connection in a composite communication service. Only the management system may be aware of the concept of a service connector. In this example, the communication system does not know whether the two newly connected service sites are of the same communication service or different communication services. The management system detects the new connection and determines if a service connector should be created.

Thus, configuration information used by the detector 77 to detect that a composite communication service has been defined may be received from the communication system or from a user of the management system 70, directly or through the composite service configuration module 73 and/or the memory 78.

Discovered service connectors or connections between services may or may not belong to an existing, previously defined composite communication service. For example, communication services could be configured for operation with each other through a CLI or other means outside a composite communication service management function of the management system 70. Even though in this case the services and the new service connector might not have been explicitly associated with a composite communication service, the manager 79 may automatically create a new composite communication service including the new service connector and the communication services it connects. A name and possibly other information associated with the new composite communication service may be automatically assigned by the manager 79 according to predefined policies, rules, or defaults for instance. Composite communication service information, and possibly information associated with the communication services and the service connector, may be stored to the memory 78 and/or presented to a user on a display. The manager 79 may also alert a user when a new composite communication service is automatically created.

As another example, a user might create a new service connector between one communication service which belongs to a composite communication service and another communication service which does not belong to the composite communication service. The new service connector may be discovered by the detector 77 and then added to the representation of the composite communication service by the manager 79. The manager 79 determines that the service connector connects a communication service of the existing composite communication service to another communication service, and thus that the service connector should also be part of the composite communication service. Similarly, since the other communication service is connected to a component communication service of the composite communication service, the manager 79 may determine that the composite communication service should be updated to include the other service.

It is possible that discovered service connectors or connections are associated with communication services which have already been configured to provide different composite communication services. The manager 79, upon detecting this occurrence, may take any of several actions.

One possible action would be to raise an alarm for one or more of the communication services, the respective different composite communication services, and a service connector specifying a logical association between the communication services, if a service connector exists. A new service connector might not have been added by the manager 79 in this case, and thus a service connector might not yet exist.

The manager 79 may also or instead select one of the previously defined composite communication services and update both composite communication services so that only the selected composite communication service includes the component communication services and a service connector between the services. Any other affected services may also be moved to the selected composite communication service. Affected services include services that are currently connected to either of the component communication services through other service connectors or connections.

Various criteria may be used by the manager 79 to decide to which composite communication service the component communication services and service connector should be added. One possible rule which could be applied by the manager 79 is to include the component communication services in the older composite communication service. The component communication services might instead be included in the composite communication service based on a calculated weight of each composite communication service. Composite communication service weights could be determined on the basis of one or more of: a total number of component communication services in each composite communication service, a number of service connectors in each composite communication service, and a number of subscribers to each composite communication service for instance.

Another possible selection or weighting criterion is based on a hierarchical arrangement of each composite communication service. Component communication services may be assigned to levels or tiers in a hierarchy of a composite communication service according to a type of each composite communication service or the OSI (Open Systems Interconnection) layer associated with the composite communication service, for example. A mapping between services and tiers may be specified in a lookup table stored in memory, or by other means. With reference to FIG. 2, the MPLS/BGP VPN service 42 is at a top tier of the composite communication service, the VPLSs 44, 46, 48 and the IES 50 are at the next tier, the H-VPLSs 52, 54, 56, 58, 60 are at the next lower tier, and the VLAN services 62, 64, 66, 68 are at a lowest tier of the composite communication service 40. Possible tier-based decision criteria include selecting the composite communication service having the most or least tiers, or selecting the composite communication service in which a component communication service associated with a discovered connection or service connector has been assigned to a higher or lower tier.

Explicit selection of one of the composite communication services by a user, responsive to an alarm or user prompt, is also contemplated.

Another option for handing the multiple composite communication service situation is to create a new composite communication service including the communication services and a service connection between those services. Any or all affected services may also be moved to the new composite communication service.

The manager 79 may also enforce additional rules to control how composite communication services are managed. For example, as will be apparent from the foregoing, the manager 79 may enforce a rule that a communication service may be configured to provide only one composite communication service. A set of composite communication service rules may also or instead include one or more of the following rules, among others: a rule that a communication service may be removed from a composite communication service only if the communication service is not configured for operation with any other communication service which provides the composite communication service, and a rule that a composite communication service may be deleted only if no communication services are configured to provide the composite communication service. Thus, service connectors and services may first have to be removed from a composite communication service before component communication services and/or composite communication services can be moved or deleted.

Figure 4:
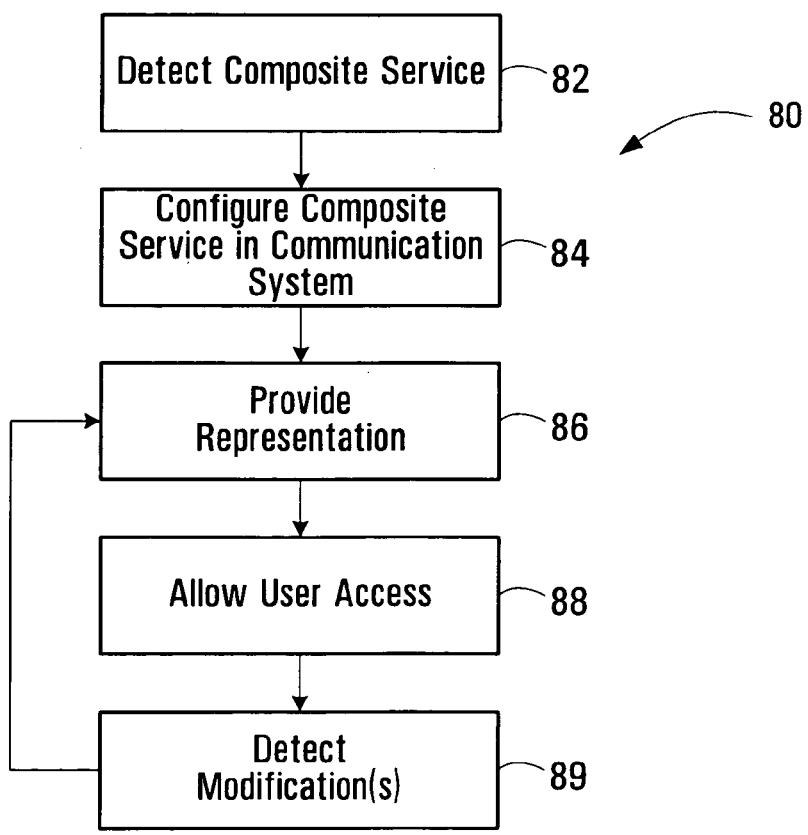
FIG. 4 is a flow diagram of a composite communication service management method.

FIG. 4 is a flow diagram of a composite communication service management method. The method 80 begins at 82 with an operation of detecting that a composite communication service, to be provided by one or more communication services supported in a communication system, has been defined. As described above, this detection may be based on received inputs and/or configuration information associated with a communication service supported in the communication system.

At 84, equipment and/or component communication services in the communication system may be configured by sending configuration commands into the communication system. This operation might not be performed in all embodiments or for every composite or component communication service, such as where the composite communication service detection at 82 was based on the detection of actual configurations of component communication services in the communication system.

The method 80 proceeds at 86 with an operation of providing a representation of the composite communication service. The representation includes an indication of whether a communication service is configured to provide the composite communication service, and may be provided in the form of information stored in a memory and/or a visual representation presented on a display.

Once a composite communication service has been defined, access to the representation of the composite communication service may be provided, as shown at 88. Such access enables management of the composite communication service by changing its component communication services and/or its service connectors. These and possibly other modifications to the composite communication service, whether made by modifying the representation or by making changes in the communication system, are detected at 89, and the representation of the composite communication service is updated accordingly at 86.

Various ways of performing the operations shown in FIG. 4, as well as other operations which may be performed in some embodiments, may be apparent from the foregoing description of the management system 70 of FIG. 3.

Those skilled in the art will also appreciate that further variations of the method 80 are possible. Other embodiments of the invention may involve further, fewer, and/or different operations performed in a similar or different order than shown.

The process of defining and managing a composite communication service will be further described with reference to example UIs which may be provided in embodiments of the invention. The UIs shown in FIGS. 5-8 are intended solely for the purposes of illustration, and do not limit the scope of the invention. Other embodiments of the invention may implement composite communication service management functions using different UI layouts and elements, or even nongraphical UI techniques such as a CLI. In addition, the UIs shown in FIGS. 5-8 are associated with specific types of composite communication service, component communication service, and service connector. UIs for different types of service and service connector may be substantially similar or different than shown.

FIGS. 5-8 and the corresponding descriptions thereof should be interpreted accordingly.

Figure 5:
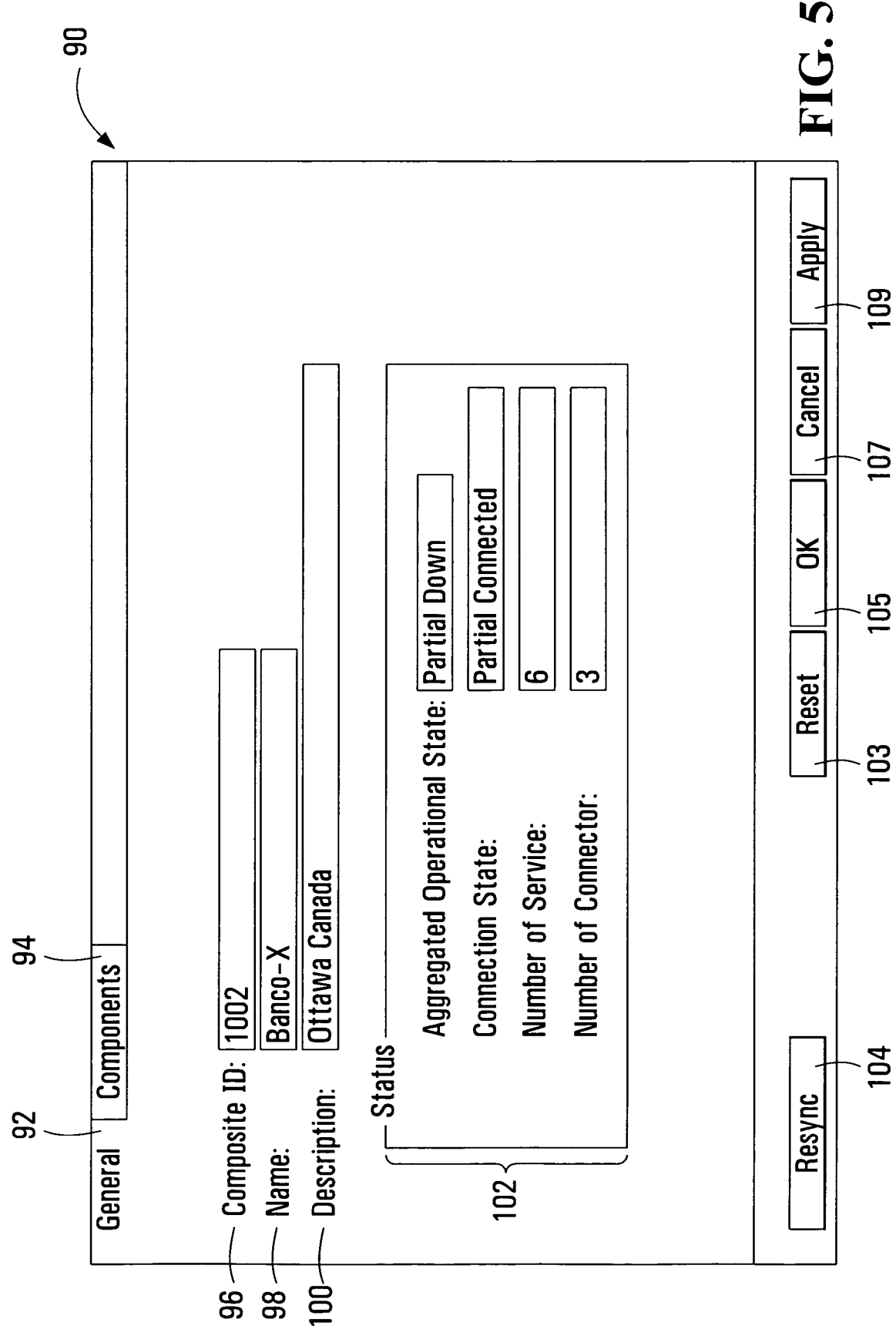
FIG. 5 is a block diagram of a UI (User Interface) for defining and managing a composite communication service.

FIG. 5 is a block diagram of a UI for defining and managing a composite communication service. The UI 90 includes tabs 92, 94 for moving between general information and component communication service information for a composite communication service. General composite communication service information is shown in FIG. 5, and component communication service information is described in further detail below.

As shown, general composite communication service information includes an identifier 96, which in some embodiments is automatically assigned when a user invokes a function to define a new composite communication service.

At 98 and 100, respectively, a composite communication service name and description may be entered for a new composite communication service or modified for an existing composite communication service.

Status information is presented in the UI 90 at 102. Although the status information at 102 reflects statuses which are automatically determined by a management system and presented in the UI 90, it should be appreciated that user control of composite communication service status is also contemplated. A user may wish to explicitly control the operational state of a composite communication service, when the composite communication service is first being created for instance.

The status information at 102 includes and aggregated operational state, which may be determined on the basis of operational states of any component communication services and/or service connectors, for example. Connection state provides an indication of whether all component communication services are "reachable" by all other component communication services through service connectors and connections in the communication system. This does not necessarily mean that every component communication service must be connected to each other component communication service by a service connector, or that every component communication service would actually communicate with all other component communication services. The composite communication service 40 shown in FIG. 2, for example, might be characterized as fully connected in that every component communication service is at least indirectly reachable by all other component communication services, even though not all of the services would necessarily communicate with all other services. The VPLSs 44, 48, for example, might never communicate with each other, but could still be considered reachable and connected for the purposes of determining connection state of the composite communication service 40.

Indications of the number of services and the number of connectors in the composite communication service are also provided at 102.

Various functional visual elements which allow a user to invoke respective functions are shown at 104, 103, 105, 107, 109. The resync element 104 invokes a resync function to update a management system database and/or configurations in a communication system to reflect any modifications made to a composite communication service. Selection of the reset element 103, using a mouse and cursor for instance, resets at least user entered information in the UI 90. An "OK" function invoked by selecting the element 105 accepts user inputs and may close the UI 90, whereas an apply function invoked by selecting the element 109 may accept user inputs without closing the UI 90. Although selection of the resync element 104 invokes a resync operation immediately, composite communication service information distribution and/or configuration changes are performed on the next resync operation when the "OK" or apply elements 105, 109 are selected. The next resync operation could be manually invoked at a later time or performed in accordance with a predefined schedule or trigger conditions. A cancel function invoked by selecting the element 107 ignores any information entered by a user and may also close the UI 90.

Further, fewer, and/or different types of information and functions than shown in FIG. 5 may be provided in other embodiments.

Figure 8:
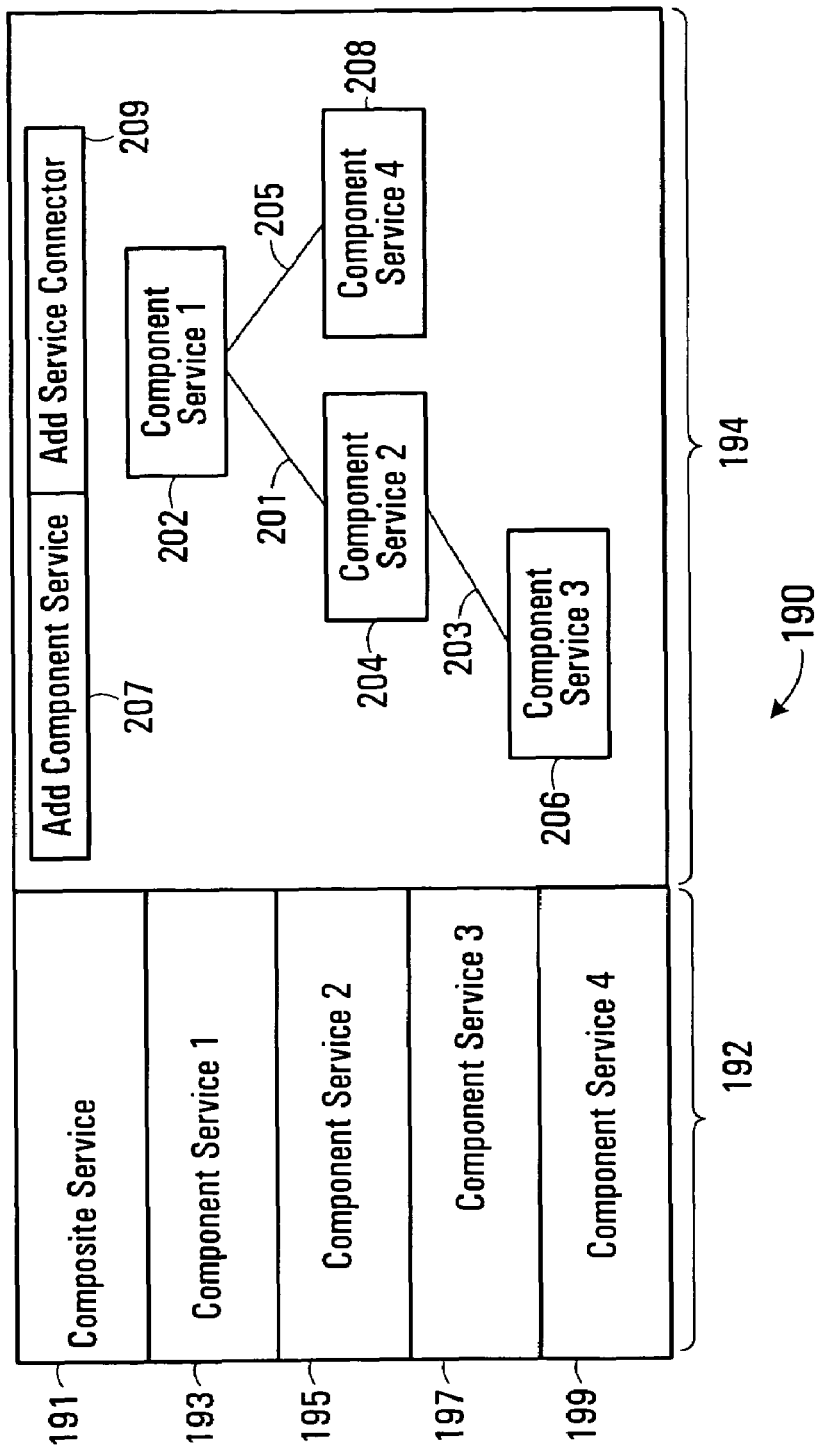
FIG. 8 is a block diagram of a UI displaying a representation of a composite communication service and the component communication services for providing the composite communication service.

Selection of the components tab 94 at the top of the UI 90 allows a user to navigate to a listing or other representation of any component communication services which have been configured to provide the composite communication service. This representation, an illustrative example of which is shown in FIG. 8 and described in detail below, may also allow a user to manage component communication services and/or service connectors to a composite communication service. In another embodiment, component communication service and service connector management functions may be directly invoked from the UI 90.

FIG. 6 is a block diagram of a component communication service UI which could be displayed when a user wishes to add a component communication service to a composite communication service or to view details of a component communication service which is already part of a composite communication service.

The UI 110 includes, at 112, information associated with an owner of the component communication service. An owner of a communication service may be a company, for example, which provides the communication service to end users who are subscribers of the service. A service owner may or may not also own the infrastructure through which the service is provided.

Other information associated with the owner is accessible to a user by selecting the view element 113, which may open another screen displaying subscriber information.

Information associated with the composite communication service to which the component communication service belongs or is being added is indicated at 114. The composite communication service information includes composite communication service ID, name, and aggregated operational state. The view element 115 provides access to other information for the composite communication service, and selection of the view element 115 may display the information, and possibly the UI 90, shown in FIG. 5.

Service-specific information presented in the UI 110 includes a service ID 116, which may be automatically assigned by a management system. A service name and description at 118, 120 may be entered by a user. Administrative status of the service at 122 is selectable from a pull-down menu in the example UI 110. Service operational state and some possible causes of operational states other than an "up" or analogous state are shown at 124, 126, respectively.

A component communication service might be an existing service which has already been created in the communication system, or a new service which is to be created and added to a composite communication service, for example. Creation of a new service may be accomplished by entering information in the UI 110 and possibly other information associated with the component communication service. The other service information may be accessible through a service information view element or tabs similar to those shown at 92, 94 in FIG. 5 for instance.

Removal of a component communication service from a composite communication service may be accomplished by selecting the remove element 134. If removal conditions are violated, where a service connector between the component communication service and another component communication service of the composite communication service exists, for example, an error message or other alert may be presented. The alert may allow the user to abort the removal operation or to proceed with removal of any or all of the component communication service, the service connector, and possibly any other affected component communication services. A move function, to move a component communication service from one composite communication service to another existing or new composite communication service, may be provided in a similar manner.

An analogous remove element and function may also be provided in the UI 90 to allow a user to remove a composite communication service. In the case of a composite communication service removal, an alert might be presented if all component communication services and/or service connectors have not already been removed from the composite communication service.

The topology view element 136 provides a user with access to a complete view of the composite communication service to which a component communication service belongs. FIG. 8 shows an example of a composite communication service topology view at 194, and is described in further detail below.

The resync, reset, "OK", cancel, and apply elements 132, 133, 135, 137, 139 invoke respective functions described above with reference to FIG. 5, but for a composite communication service.

Figure 7:
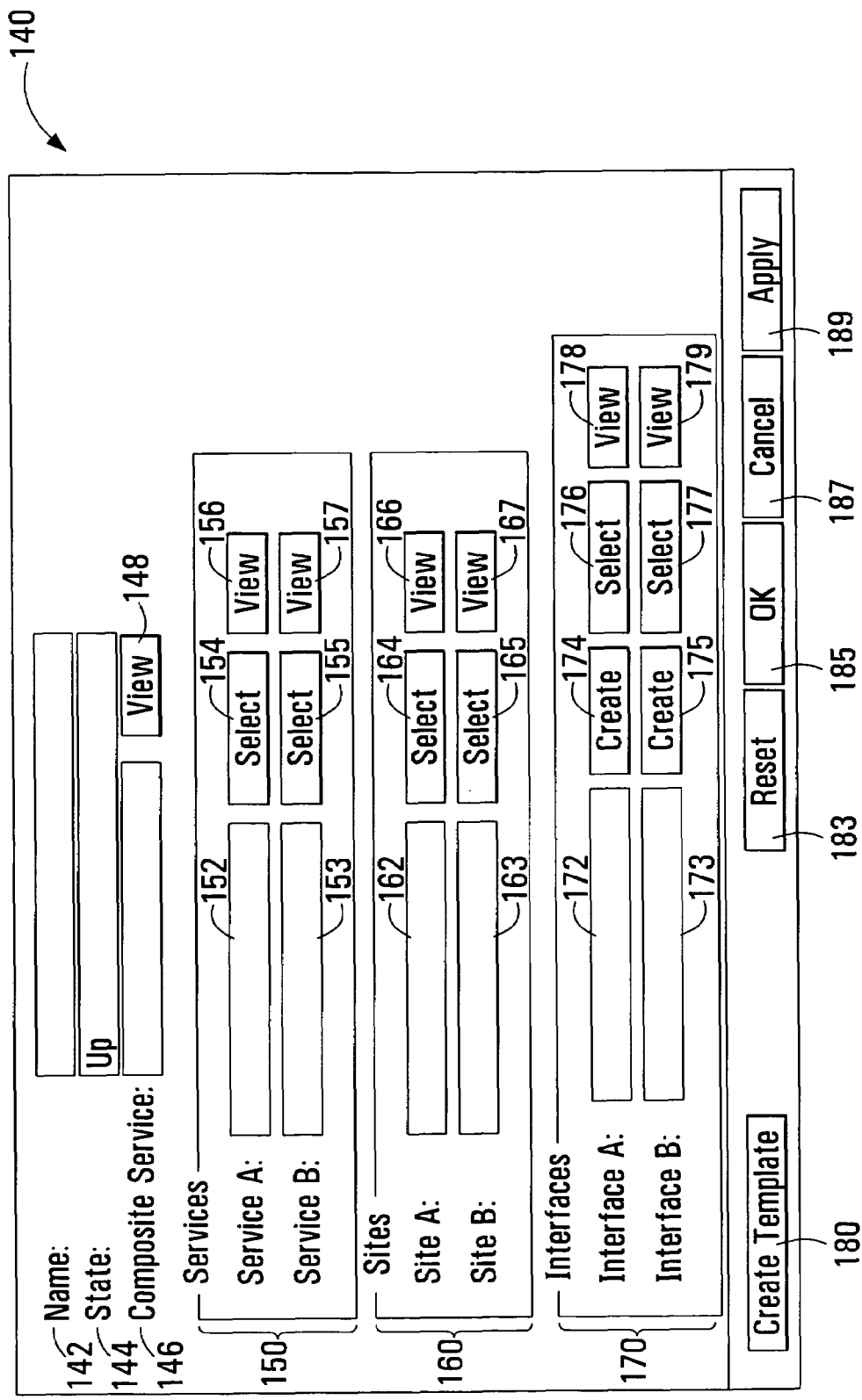
FIG. 7 is a block diagram of a service connector UI.

FIG. 7 is a block diagram of a service connector UI 140 which is presented when a user selects an add service connector, view service connector, or analogous function.

A service connector name may be entered and displayed at 142, and its state is displayed at 144. The composite communication service to which a service connector belongs or is to be added is displayed at 146. The composite communication service may be entered by the user or automatically populated by a management system. Pre-population of the composite communication service field at 146 might be preferred, for example, when an add or view service connector function is invoked from a composite communication service management UI as described below. Details of the composite communication service may be viewed by selecting the view element 148.

The component communication services connected or to be connected by the service connector are selected at 150. A user may select component communication service names or other identifiers from lists displayed when the elements 154, 155 are selected. A name or other identifier of each selected service is then displayed at 152, 153. Details of each service are accessible by selecting the elements 156, 157.

Service site and interface information for a service connector are configured and displayed in a substantially similar manner at 160, 170, by selecting from lists displayed when the elements 164/165, 176/177 are selected. Information is then displayed in the fields 162/163, 172/173. Details of service sites and interfaces are available through the view elements 166/167, 178/179.

A create new interface function, through which a user can specify and configure new interfaces, is invoked by selecting the elements 174, 175. Substantially similar elements may be provided in other embodiments to allow a user to also or instead configure new services and/or sites.

As noted above for component communication services, a service connector may be created from a template or used as a basis to create a new template. The create template function is shown in the UI 140 at 180.

The elements 183, 185, 187, 189 invoke functions which have been described above, for a service connector.

FIG. 8 is a block diagram of a UI displaying a representation of a composite communication service and component communication services configured to provide the composite communication service. The UI 190 includes a composite communication service listing portion 192 for displaying information associated with the composite communication service and a topology view portion 194 for displaying a representation of the composite communication service in terms of a topology of its component communication services and service connectors.

The portion 192 includes a visual element 191 representing the composite communication service. The element 191 may present the composite communication service name and/or other information defined for the composite communication service. The elements 193, 195, 197, 199 similarly present information for the component communication services of the composite communication service, which in the example shown includes four component communication services.

The display of information for both the composite communication service at 191 and its component communication services at 193, 195, 197, 199 is illustrative of one manner in which a UI may provide an indication that one or more component communication services have been configured to provide the component communication service. As described above, a composite communication service may have zero or more component communication services. If no component communication service information is displayed at 193, 195, 197, 199, then no component communication services have yet been added to the composite communication service.

The layout of the elements shown in the portion 192 may also provide an indication of relationships between component communication services. The order in which the composite communication services are listed at 192 and their indentation may reflect the hierarchical structure of the composite communication service, for example. In FIG. 8, the elements 193, 195, 197, 199 indicate that the component communication service 1 is at a highest tier of the composite communication service, the component communication services 2 and 4 are at the next tier, and the component communication service 3 is connected to the component communication service 2 and at a next lower tier.

Another way of representing a composite communication service is shown in the portion 194. An icon 202, 204, 206, 208 is displayed for each of the four component communication services. Service connectors between the icons are also displayed at 201, 203, 205, providing a complete picture of the composite communication service, its component communication services, and the connections therebetween.

Although not explicitly shown in FIG. 8, other information such as service and service connector type and status may also be indicated in the UI 190. In one embodiment, symbols are used to specify service and service connector types, whereas colors indicate states of any or all of component communication services, service connectors, and the composite communication service.

The UI 190 provides a clear representation of a composite communication service. This may significantly simplify management of composite communication services, particularly for composite communication services which involve inter-operation between multiple services of different types.

The elements 207, 209 are functional elements which may be selected by a user to invoke management functions, to add a component communication service and a service connector, respectively, to the composite communication service 207. Selection of the elements 207, 209 may result in the display of the UIs 110, 140 to allow a user to add a component communication service or service connector to the composite communication service.

The functional visual elements 207, 209, and similarly other functional visual elements disclosed herein, are intended solely for the purposes of illustration. UIs according to other embodiments of the invention may include additional elements for invoking other functions, for example. Other mechanisms for invoking management functions are also contemplated. Pulldown and/or popup menus may be used instead of or in addition to functional "button" visual elements. Further, component communication service- or connector-specific functions, to view, remove, move, and/or modify a service or connector for instance, may be invoked in some embodiments by clicking on or otherwise selecting a corresponding indicator 191, 193, 195, 197, 199 or icon 201, 202, 203, 204, 205, 206, 208 in the UI 190.

Although shown in a single UI 190, the portions 192, 194 are provided as different screens according to one embodiment of the invention. For example, the list representation at 192 could be presented to a user under the components tab 94 of the UI 90 of FIG. 5, whereas the representation at 194 may be presented when a user selects the topology view element 136 in the UI 110 of FIG. 6.

The concept of composite communication services, as well as some aspects of configuring and managing such services, have been described above. Embodiments of the present invention provide further tools and techniques to facilitate the management of composite communication services.

In particular, various functions based on the structure of a composite communication service are disclosed. An ordered structural approach, illustratively a hierarchical structure, aids in configuration and management of composite communication services. For example, representation of an ordered structure of a composite communication service may help network/service operators to easily visualize the topology of component communication services in a composite communication service, to quickly identify any areas and/or services affected by an event such as a service or connection failure, and to raise appropriate alarms for the affected areas/services. An ordered structure may be particularly useful for applications such as triple play services, due to the broadcast nature of the service, and also for other composite communication services having many component communication services.

As noted above, the concept of a composite communication service may be unknown to a communication system in which managed services are supported. The communication system may also be unaware of the structure of a composite communication service. This does not in any way preclude a structural approach to composite communication service management.

Embodiments of the invention provide for management of complex combinations of communication services which may be of different service types and/or supported by multiple equipment types/versions, for example, through structured composite communication services. A structured composite communication service approach facilitates an understanding of the actual topology of a composite communication service in terms of component communication service tiers, tier order, and component communication service interconnections, for example.

Structure-based composite communication service functions may be provided by a management system having the structure shown in FIG. 3. In one embodiment, the same management system provides the functions described above in addition to structure-based functions. However, it should be appreciated that structure-based functions may be implemented independently of other composite communication service functions.

With reference again to FIG. 3, the detector 77 may detect component communication services which are to provide a composite communication service in a communication system. This detection may be based on user inputs and/or information received from the communication system, for example. In accordance with an aspect of the invention, the manager 79 determines, for each detected communication service, an associated tier or level for the communication service in the composite communication service. The composite communication service is structured as an arrangement of communication service tiers having a tier order, illustratively a hierarchical structure, and the detector 77 determines where in the composite communication service structure each component communication service is positioned.

The determination of the tier to which a detected communication service belongs may involve different operations, depending upon whether or not the detected service has already been assigned to a tier. When a component communication service is first added to a composite communication service as described above, for example, the manager 79 may assign the newly added service to a tier. Tier assignments may be based on one or more criteria, such as a type of a component communication service, the OSI layer at which the component communication service is supported in the communication system, the type of communication equipment by which the component communication service is supported, and/or selection of a specific tier by a user. In one embodiment, a mapping between service type and tier is specified in a lookup table stored in the memory 78.

It should be appreciated that the assignment of a component communication service to a particular tier of a composite communication service may have no affect or meaning outside that composite communication service. As noted above, for example, a communication system may be completely unaware of the concept of a composite communication service, and similarly tiers, tier order, and other structural features of a composite communication service may have significance only at a management system.

A set of communication service tier criteria may include one or more predetermined criteria, one or more criteria defined by a user, or some combination of predetermined and user-defined criteria. Predetermined criteria could be pre-installed or subsequently loaded into the memory 78, for example, whereas a user may define and/or modify criteria by entering information through the configuration/management interface 72.

Considering the example of a service type criterion and the composite communication service 40 of FIG. 2, a mapping table might be stored in the memory 78 to map MPLS/BGP VPN service type to a first tier, VPLS and IES service types to a second tier, H-VPLS type to a third tier, and VLAN service type to a fourth tier. This mapping illustrates that service type to tier mappings need not be exclusive, as both VPLS and IES would be assigned to the same tier in this example.

As will be apparent from FIG. 2, the component communication services which are grouped into the same tier need not necessarily have any relationship with each other. The second service tier shown in FIG. 2, for example, includes different types of component communication services. Although the VPLS 48 and the IES 50 are connected in FIG. 2, the other VPLSs in the second tier are not connected to other component communication services in that same tier.

The TV broadcast composite communication service 40 of FIG. 2 provides a clear example of how a composite communication service could be arranged as a hierarchy of tiers. However, the present invention is in no way restricted to this or any other particular type of composite communication service, tier arrangement, or tier order. A tiered arrangement of component communication services may also be useful for other types of composite communication service, such as a business VPN for instance.

Another aspect of structured composite communication services is the relative ordering of tiers. Tier order in the structure of a composite communication service may similarly be predetermined or defined by a user. In the above example, the tier including MPLS/BGP VPN services is highest in the tier order, followed by the tier including VPLS and IES services, the tier including H-VPLS services, and the tier including VLAN services.

Once a newly added component communication service has been assigned to a communication service tier, the memory 78 is preferably updated to include an indication of the composite communication service, if this has not already been stored, and an indication of the tier to which the component communication service has been assigned. The manager 79 can thereafter determine the tier to which the component communication service belongs by accessing the memory 78.

Thus, the manager 79 may determine the tier to which a component communication service belongs by either determining the tier to which the communication service has been assigned or, for a component communication service which has just been added to a composite communication service, assigning the added component communication service to one of the tiers.

The composite communication service manager 79, in accordance with another aspect of the invention, also provides a representation of the composite communication service. The representation includes an indication of each component communication service detected by the detector 77, as well as the tier order. Providing an indication of the ordering of the tiers need not necessarily include any sort of tier name or identifier of the tier. For example, the positions at which icons representing each component communication service are displayed in a UI may provide the tier order indication without actually displaying additional tier information. For the composite communication service 40 of FIG. 2 for instance, displaying icons representing each component communication service at the relative locations shown would provide an indication that the composite communication service 40 has been arranged into four tiers of component communication services, with the tiers being ordered in a specific manner.

Further examples of display representations are described in further detail herein. It should be appreciated, however, that the representation of a composite communication service is not necessarily a visual representation. The representation may also or instead be provided in the form of information stored in the memory 78, for example.

As described above, at least some of the component communication services of a composite communication service may be configured for operation with each other by one or more service connectors. The detector 77 may detect any or all of these service connectors, and indications of detected service connectors, if any, may be included in the representation of the composite communication service to illustrate how component communication services of a composite communication service are interconnected.

Service connectors are also used in some embodiments to determine the extent to which an event which directly affects a portion of the composite communication service may also affect other portions of the composite communication service. Events may include faults, service degradation, or other actual events detected in the communication system by communication equipment or by another module or subsystem of the management system 70, for example. Test events, which might not have actually occurred, are also contemplated. For instance, a user might invoke an event assessment operation to investigate how loss of a connection in the communication system or removal of a component communication service would affect a composite communication service.

An indication of the event and/or a result of an event assessment may be provided in the representation of the composite communication service so as to alert a user to the event and its effects. From a displayed representation for instance, a user can easily determine affected portions or areas of a composite communication service. Display color is one possible attribute which might be used to indicate affected/unaffected services and/or connectors, such as to display icons representing affected elements in a predetermined color. Other types of indication are also contemplated.

Alarms may also or instead be generated, for example, to alert other systems and components of a problem in the composite communication service.

The handling of "affected/unaffected" indications, alarms, status monitoring, etc., may be specified in rules which may include predetermined rules, user-defined rules, or both.

Details of how a composite communication service structure could be analyzed in some embodiments are described below by way of several illustrative examples, with reference to FIGS. 10-13.

Figure 9:
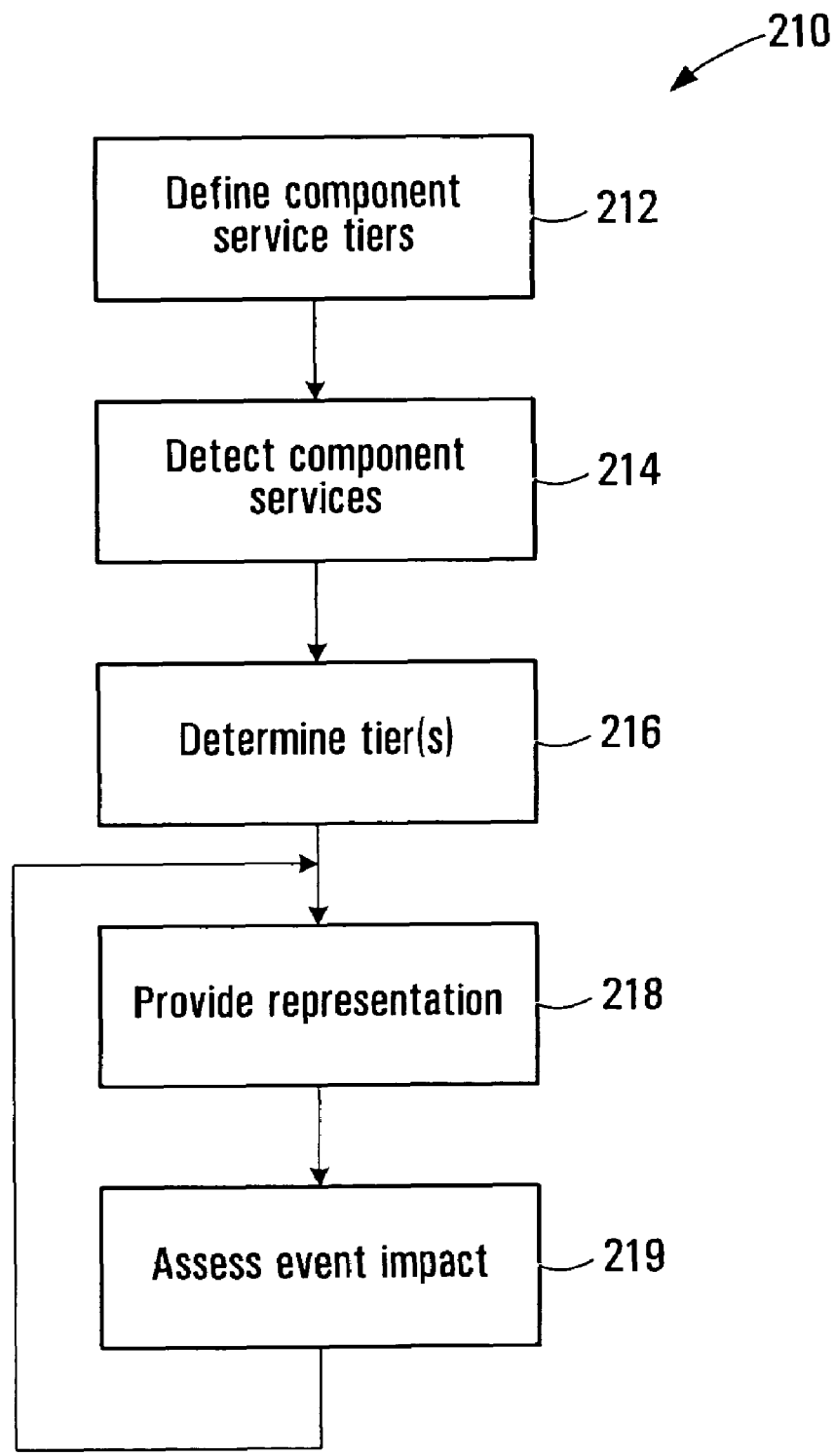
FIG. 9 is a flow diagram illustrating a method according to an embodiment of the invention.

FIG. 9 is a flow diagram illustrating a method according to an embodiment of the invention. As noted above in conjunction with the flow diagram of FIG. 4, the method 210 is intended solely for the purposes of illustration. Methods according to other embodiments of the invention may include further, fewer, and/or different operations performed in a similar or different order than shown.

The method 210 begins at 212 with an operation of defining the communication service tiers of a composite communication service, into which component communication services for providing that composite communication service are to be included. This involves establishing, for each tier, a set of one or more criteria to be used in assigning component communication services to the tier.

The criteria for use in assigning services to tiers may include criteria based on one or more of a communication service type, the tier of another communication service to which a communication service is connected, a user input specifying a particular tier, and possibly other features or characteristics associated with a communication service, some of which have been noted above.

A relative order of the tiers in the composite communication service is also defined at 212, to thereby define an ordered structure of the composite communication service.

In some implementations, the operations at 212 would be performed only once, either by a supplier of a management system, in the case of a predetermined composite communication service structure, or by a user if composite communication services are to be structured in accordance with user preferences. Component communication services of all composite communication services then have their tiers defaulted in the same way.

However, it should be appreciated that variable composite communication service structures are also contemplated, to provide flexibility in structuring different composite communication services.

Another possible scheme may combine aspects of the above fixed and variable structure techniques. A management system may be fixed to the extent that all managed composite communication services are structured in the same way, but variable in that the common structure can be modified. In this type of management system, the structures of existing composite communication services might be revised accordingly when a previous service structure template is modified.

The method 210 continues at 214 with an operation of detecting component communication services for providing a composite communication service. At 216, a determination is made as to which tier includes each detected component communication service. A tier may be given to a communication service at the time the communication service is created within or added to a composite communication service. If a communication service is auto-detected as part of a composite communication service based on communication system configuration, then it may be given a tier based on pre-defined and/or user-defined rules. When a communication service is created within or added to a composite communication service via a GUI or OSSI for a management system which supports composite communication services, then the tier can be entered or selected by a user.

A representation of the composite communication service is provided at 218 in some embodiments. The representation, which may be a visual representation or a representation stored in a memory, for example, includes an indication of each detected communication service and the order of the communication service tiers.

In order to assess the impact of a problem or other event affecting the composite communication service, at 219, relationships between the detected communication services may be detected. Effects of the event may then be "propagated" through the composite communication service, or at least through portions of the composite communication service which are of interest for the assessment, based on the detected relationships. As described above, the relationships may be specified in service connectors of the composite communication service.

The operations shown in FIG. 9 may be performed in any of various ways, some of which may be apparent from the present disclosure. Further operations not explicitly shown may also be performed. For example, the assessment at 219 may be invoked manually by a user, automatically when a service or connection fault, service degradation, or other event is detected, or more generally when an assessment trigger condition has been satisfied. Other alternative or additional operations may also be performed in other embodiments.

The above and other structure-based composite communication service features and functions are described in further detail below, with reference to example composite communication services and events shown in FIGS. 10-13.

Figure 10:
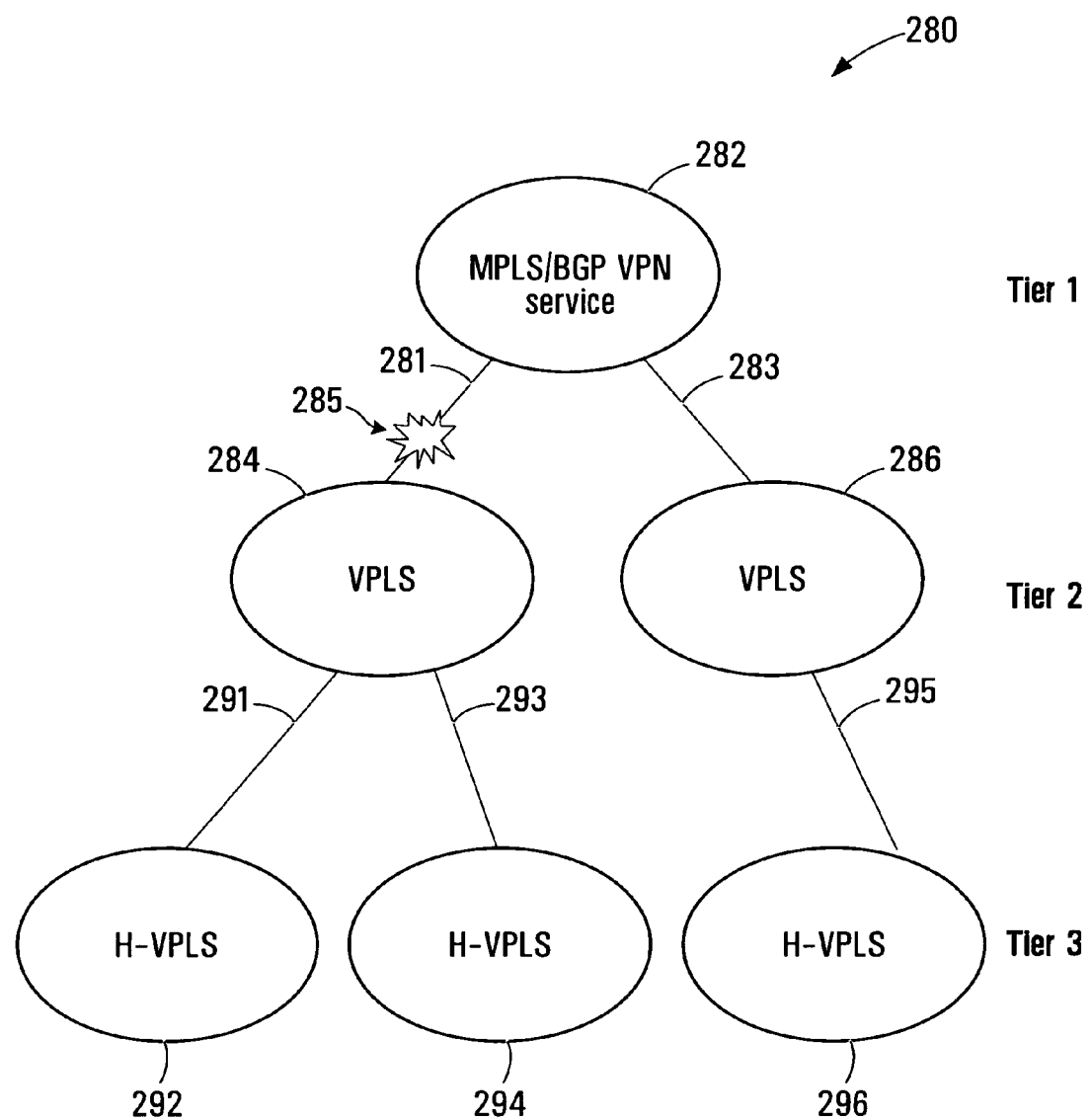
FIGS. 10 and 11 are block diagrams of example composite communication services affected by service connector problems.
Figure 11:
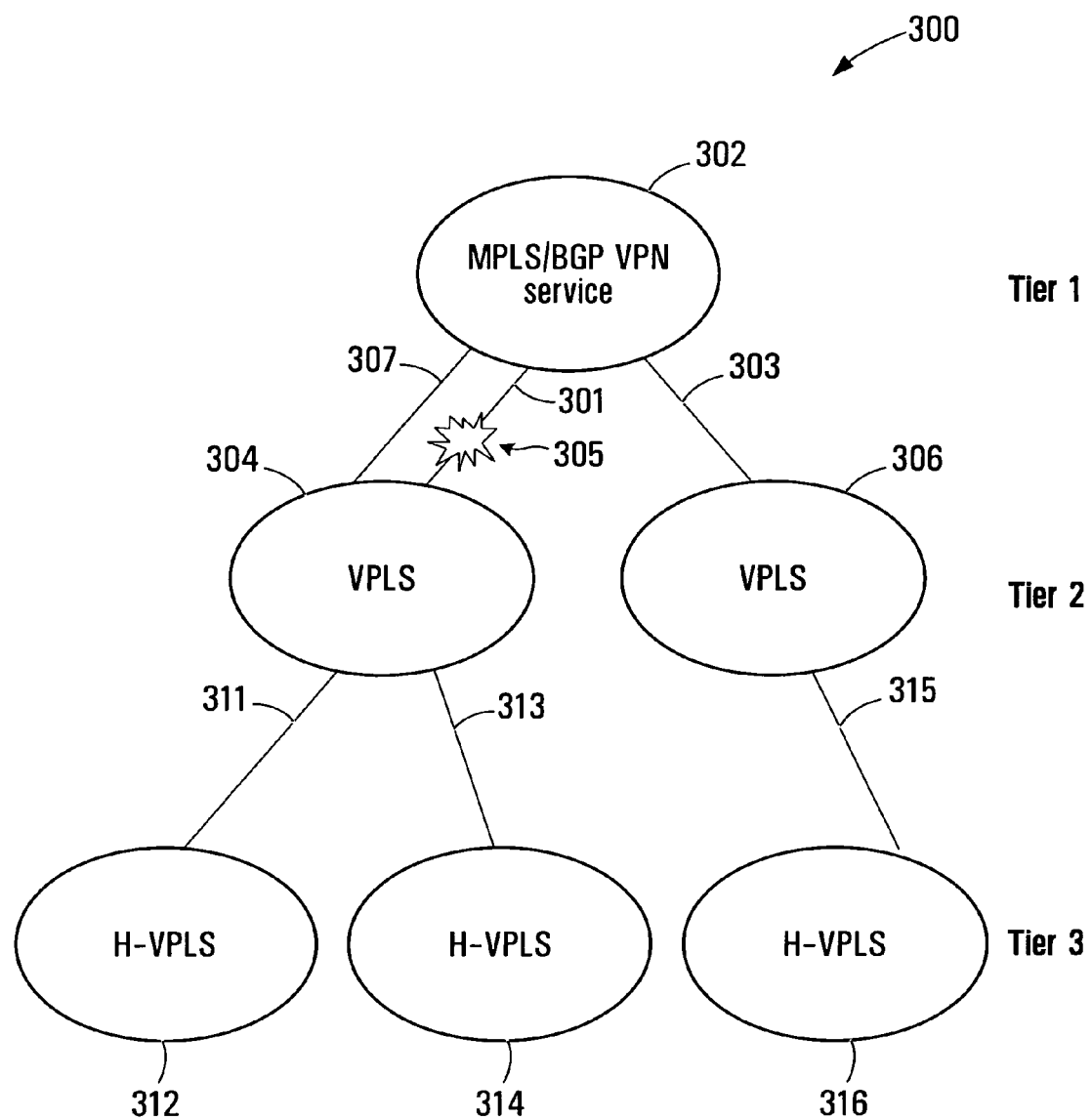

FIGS. 10 and 11 are block diagrams of example structured composite communication services affected by service connector problems, and illustrate the above operations in further detail.

With reference first to FIG. 10, the composite communication service 280 has a structure including three communication service tiers having an order from tier 1 through tier 3. The component communication services 282, 284, 286, 292, 294, 296 are connected as shown through the service connectors 281, 283, 291, 293, 295.

In this example, a service site belonging to the VPLS service 284 at tier 2 has its connection point, which is being used has a higher tier connector, failing. This is shown in FIG. 10 at 285. A notification is sent from the communication system to a management system which, upon the reception of this notification, triggers an assessment to determine the extent to which this failure is affecting the composite communication service 280.

The management system, and illustratively the manager 79 (FIG. 3) thereof, identifies the service from which the notification originated, and determines that the type of service is VPLS and that there is only one service connector to the next higher tier of the composite communication service 280.

The following steps are illustrative of operations which might be performed to determine if the service connector 281 is affected by the event being assessed. Suppose, for example, that the service connector problem 285 is being caused because the interface on the service site on which the connector originates is down. This seriously affects the functionality of the only service connector 281 linking the tier 2 service 284 to the tier 1 service 282, which may be deemed a loss of connectivity.

Since the service connector 281, and indeed the connection between supporting communication equipment in the communication system, is down, a check is then made to determine if the service 284 has a relationship with other services. In a composite communication service such as 280 in which relationships between services are specified by service connectors as logical associations, this check involves detecting service connectors. In FIG. 10, there are two lower tier service connectors 291, 293 to H-VPLS services 292, 294.

As a consequence of the VPLS service 284 at tier 2 being considered as affected by the failure at 285, both service connectors 291, 293 are also considered as being affected. However, it should be appreciated that this is not always the case, where a mesh connection between service sites of a service has failed for instance. This is described in further detail below in conjunction with FIG. 12.

The assessment process proceeds with the services 292, 294. The service 292 has only one service connector 291 to tier 2, and that service connector is affected by the failure of the tier 2 service 284. Thus, the service 292 also loses connectivity to the higher tiers. Since the service 292 has no other service connectors, the assessment does not proceed to another service from the service 292, as assessment of this portion of the composite communication service 280 is complete.

The service 294, also at tier 3, is processed in a similar manner and possibly simultaneously with the service 292, and is identified as being affected by the failure 285.

FIG. 11 shows a composite communication service 300 which is substantially similar to the composite communication service 280 of FIG. 10, having six services 302, 304, 306, 312, 314, 316 arranged in three tiers having an order from tier 1 through tier 3 and being interconnected by service connectors 301, 303, 311, 313, 315. One difference between the services 280, 300 is that the VPLS service 304 in the composite communication service 300 has a second service connector 307 to the MPLS/BGP VPN service 302.

Assuming the same example failure conditions described above with reference to FIG. 10, but affecting the service connector 301 as shown at 305, a notification is again sent by the communication system to a management system, which invokes an assessment process.

As above, the service 304, which is directly affected by the failure 305, is assessed, and the two service connectors 301, 307 to the service 302 at tier 1 are detected. From the notification received from the communication system, the management system is aware that the connection represented by one of the two service connectors, namely the connection corresponding to the service connector 301, is not functioning.

In FIG. 11, there is a redundant service connector 307 that is not affected by the service site failure 305 being considered in this example. Therefore, the service 304 could be determined to be not affected, i.e., it is still up and running, and the assessment stops. Since the service 304 is not affected by the failure 305, none of its connected services 312, 314 will be affected by the failure through the service connectors 311, 313.

In some embodiments, other factors are taken into consideration to determine whether a component communication service is affected by an event. For example, component communication service type and/or the topology of the composite communication service or portions thereof may also or instead be analyzed. An example of determining the effect of an event based on an internal topology of a component communication service is described below with reference to FIG. 12.

Figure 12:
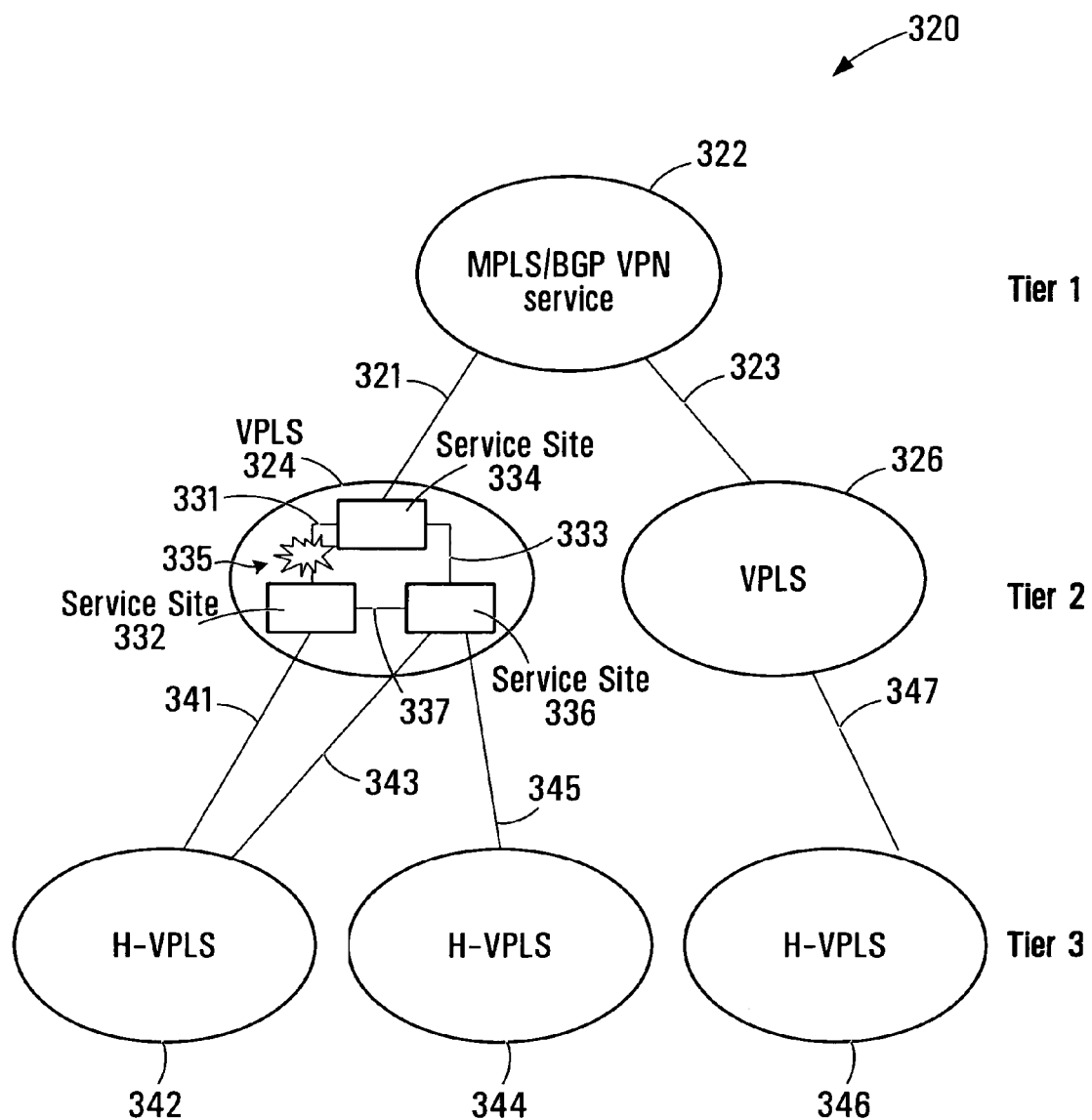
FIG. 12 is a block diagram of an example composite communication service affected by a communication service problem.

FIG. 12 is a block diagram of an example structured composite communication service affected by a communication service problem. The composite communication service 320 includes three tiers of component communication services arranged in an order from tier 1 through tier 3. The services 322, 324, 326, 342, 344, 346 are connected as shown through service connectors 321, 323, 341, 343, 345, 347. Internal mesh connections 331, 333, 337 between service sites 332, 334, 336 of the service 324 are also shown, to illustrate a mesh connection failure 335.

In this example, the failure 335 occurs within the service 324 at tier 2. A binding between two service sites 332, 334 is down for some reason. Even though VPLS services are fully meshed, the breakage between the two service sites 332, 334 actually isolates one of the service sites (332) from the higher tiers. This is due to the fact that traffic that is received by a service site from another service site is not relayed to any other sites belonging to this service. Thus, the service sites 332, 336 only relay traffic to the H-VPLSs 342, 344. Traffic received from the service site 334 is not relayed by the service site 336 to the service site 332 over the connection 337.

Responsive to a notification from the communication system indicating that the failure 335 has been detected, a management system performs a preliminary analysis and concludes that only part of the service 324 might be affected by the failure, since the service 324 includes multiple service sites 332, 334, 336.

The service connector 321 is first verified, and determined to be active. The service 324 thus has not lost connectivity to the service 322 at Tier 1. However, the failure 335 is severe enough to disrupt the quality of the service, in that an area of the service is blacked out from the higher tier service 322.

The service 324 is thus affected negatively by the failure 335, and assessment of other services is in order. The service connectors 341, 343, 345 are detected, and a determination is made as to whether these service connectors are affected. Only the service connector 341 is affected, due to the connector's termination on the isolated service site 332.

For the tier 3 service 342 that is connected to the affected service connector 341, the assessment proceeds to determine if the service 342 is affected by the failure 335. Although not directly affected by the failure 335, the service 342 may be indirectly affected through the affected service connector 341.

As described above, a determination is made as to whether there are any other connectors between the service 342 and other services, in particular the tier 2 VPLS 324 in this example. The second service connector 343 is identified as connecting to the tier 2 service 324. This service connector was not affected by the failure 335, and therefore the service 341 is still operational.

Figure 13:
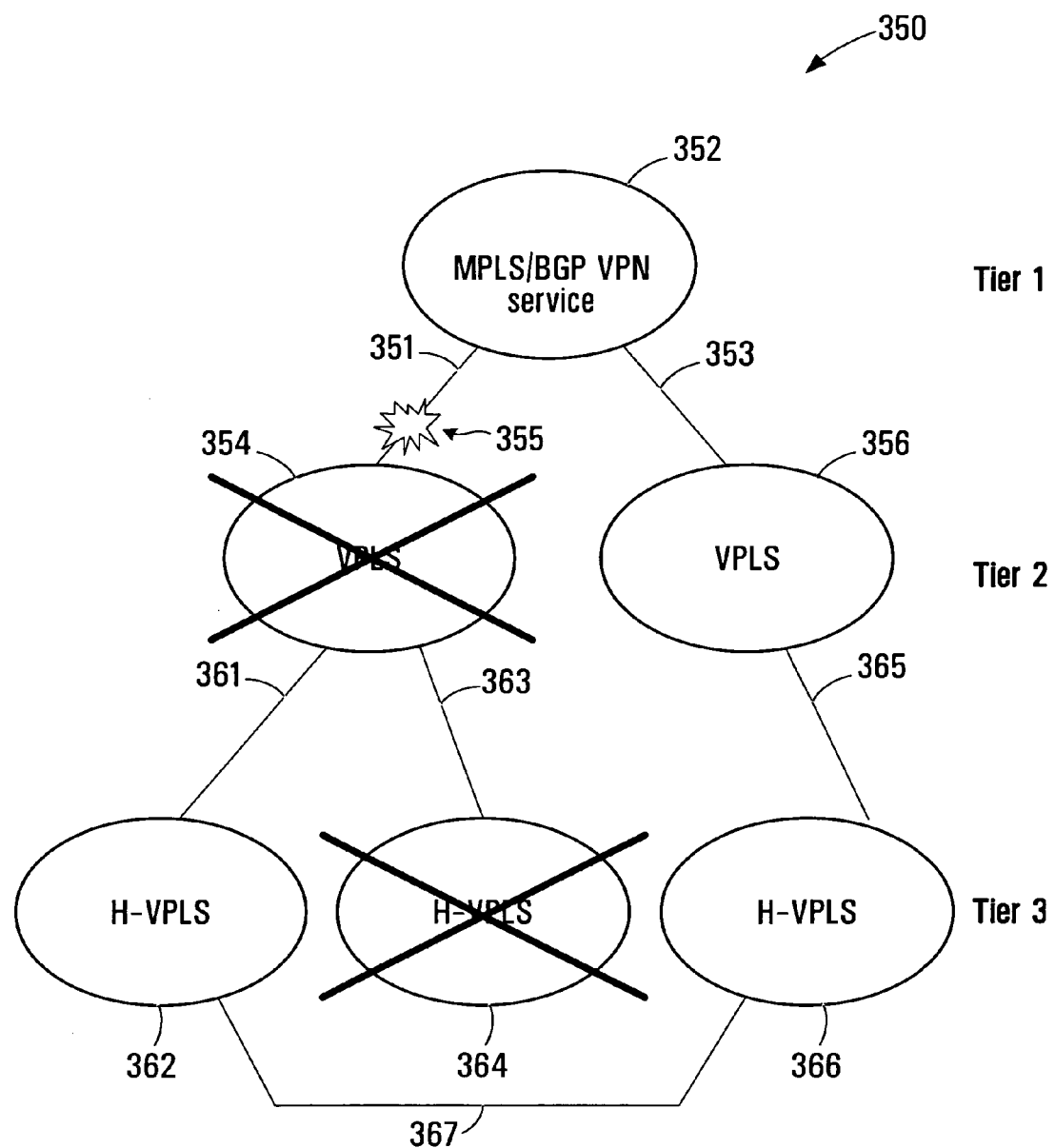
FIG. 13 is a block diagram of another example composite communication service affected by a service connector problem.

FIG. 13 is a block diagram of another example structured composite communication service affected by a service connector problem. The composite communication service 350 is substantially similar to the composite communication service 280 of FIG. 10, having six services 352, 354, 356, 362, 364, 366 arranged in three tiers having an order from tier 1 through tier 3 and being interconnected by service connectors 351, 353, 361, 363, 365, but with an additional service connector 367 which connects two services 362, 366 of the same tier.

Service connectors that connect two services of the same tier of a composite communication service may be allowed in some embodiments. Such service connectors are another example of a redundant service connector through which a component communication service may be connected to a different tier, albeit indirectly, through a portion of a composite communication service which is not affected by an event being assessed. This type of service connector might therefore be treated effectively as an upper-tier service connector.

In FIG. 13, assuming the same failure conditions at 355 as described above for FIG. 10, the services 354 and 364 are affected by the failure 355 as shown. However, the service 362 may still be operational because of the presence of the service connector 367, which connects the service 362 to the service 366. Through the service connector 367 and the service 366, the service 362 still has a connection to a tier 2 service 356. In some embodiments, some analysis is still conducted to determine whether the failure of 355 may partially affect the service 362.

Therefore, it should be appreciated that a redundant service connector might be identified on the basis of the communication service tiers, rather than only specific services, it connects. It should also be appreciated that a redundant service connector need not itself directly connect a potentially affected service to an unaffected service in a different tier.

From the foregoing, it will be apparent that assessment of the extent to which an event such as a failure affects a composite communication service, according to an embodiment of the invention, may involve determining whether a communication service which belongs to a tier in the structure of the composite communication service is affected by the event directly or through a service connector to a communication service in another tier. A service might be deemed directly affected by an event when the event is associated with the service itself, as in the case of the fault 335 (FIG. 12), or one of the service's service connectors to a higher order tier.

If the communication service is affected by the event through a service connector, then a determination is made as to whether that communication service includes a redundant service connector. A redundant service connector is a service connector which associates a communication service with a communication service in another tier through a portion of the composite communication service that is not affected by the event. As noted above, a redundant service connector may, but need not necessarily, itself connect a communication service to another communication service in a higher order tier.

A communication service which is directly affected by the event is identified as an affected service, and the assessment may continue along any service connectors which are also affected. If the affected communication service is entirely affected, such that it is no longer operational due to loss of connectivity to another tier for instance, then all of its service connectors are affected. In some cases, service connectors and/or an internal topology of the service may be analyzed to determine whether or not each service connector is affected. Assessments are then carried out for services connected to any affected service connectors.

If an indirectly affected communication service, that is, a service which may be affected by the event through a service connector, does not have a redundant service connector, then it may also be identified as affected.

Indications of any or all affected services and/or service connectors may be provided in a representation of a composite communication service, as described in further detail below.

As noted above, a representation of a composite communication service may be provided as a visual representation and/or a representation stored in a memory. Illustrative examples of each of these types of representation are described below.

Referring now to FIG. 8, two different types of visual representation are shown at 192, 194. Although shown in FIG. 8 as portions of a single UI 190, the visual representations at 192, 194 may be provided separately. Also, it should be appreciated that the present invention is in no way limited only to these two forms, layout, or content.

At 192, each component communication service of a composite communication service 191 is represented by textual visual elements 193, 195, 197, 199, in which a service identifier such as a service name may be displayed. The relative position of these visual elements, particularly relative indentations in the listing 192, is indicative of a communication service tier to which each component communication service represented by the visual elements belongs. It is clear from the indentation in the listing at 192 that the component communication service 1 represented by the visual element 193 is in a tier by itself. Similarly, the component communication services 2 and 4 are in another tier, and the component communication service 3 is in a third tier. For further clarity, indentations and/or tiers might be explicitly indicated by symbols or characters, such as a number of symbols, for instance one, two, or three lines, dots, etc. in the example 192, or tier-specific numbers or characters, for example.

Indentations in the listing at 192 are also indicative of an order of the communication service tiers in the composite communication service. The tier to which the component communication service 1 belongs is a highest order, followed by the tier of the component communication services 2 and 4, and then the tier to which the component communication service 3 belongs.

In the representation shown at 194, each component communication service is represented by an icon 202, 204, 206, 208, which in some embodiments also indicates type and/or status of the component communication service as described below. The icons are displayed in a tree form, with the icon 202 representing the component communication service 1 in a highest order tier on a first row at a first vertical position, the icons 204, 208 representing the component communication services 2 and 4 in a next tier in the order on a second row, and the icon 206 representing the component communication service 3 in a following tier in the order on a third row, and so on, where a composite communication service includes component communication services in more than three tiers.

In some embodiments, "empty" service tiers in the structure of a composite communication service could also be represented. A composite communication structure template might include five tiers, whereas in the example of FIG. 8 only three of those tiers are used. The two empty tiers could be represented in this case by a line, block, or other "placeholder" so that a user is aware that there other tiers have been defined for a composite communication service but do not yet include any component communication services.

A management system may either allow or block moving of a visual element from a current vertical level or row in the representation 194. If blocked, then a user may only move an icon within its current vertical level. An icon may "snap" back to its current vertical level if a user attempts to move the icon upwards or downwards in the UI, for example. Both the current tier and at least the vertical display position of the component communication service and its corresponding icon are maintained. Horizontal position may be varied or also fixed.

Alternatively, if a user is allowed to move an icon from its current vertical level, through a "drag and drop" or other type of user input, then moving the icon to a different vertical level may cause the component communication service represented by the icon to be reassigned to a different tier.

Rules controlling vertical movement, or more generally inter-tier movement, of icons in a UI may be specified for all composite communication services managed by a management system, on a per-composite communication service basis, on a per-tier basis, or even on a per-component service basis. These rules could include either or both of predetermined rules and user-defined rules.

Although not explicitly shown in FIG. 8, a functional visual element similar to those shown at 207, 209 could be provided to re-arrange icons into the tree form shown at 194. A user might drag and drop icons to any new position in a displayed screen, which may or may not cause the corresponding component communication service and icon to be reassigned to a different tier. Selecting a "tree form" or analogous functional visual element will realign icons, if necessary, along a vertical level or Y-coordinate of the UI, illustratively by modifying the Y-coordinate of each icon. That is, all component communication service icons of the same tier will have the same Y-coordinate in this case.

Component communication service icons may indicate service type, by a name or other text for instance, and/or status, such as by color. For example, considering the service 320 and the fault 335 of FIG. 12, icons representing the MPLS/BGP VPN service 322, the VPLS service 324, and the H-VPLS services 342, 344 could be labelled "MPLS/BGP VPN", "VPLS", and "H-VPLS". The MPLS/BGP VPN service 322 and the H-VPLS 344 are fully operational, and could be shown in green. Even though the fault 335 has occurred in the VPLS service 324, this does not affect connectivity to its H-VPLSs 342, 344. It may be useful, however, to show an icon representing the VPLS 324 in yellow, to indicate that the service is operating but not in a normal condition.

The H-VPLS 342 is itself operating normally in the sense that it is still connected to a component communication service in the higher order tier 2. Its operation could be considered somewhat abnormal in that one of its two service connectors 341, 343 is no longer operational. Thus, the H-VPLS 342 could be shown in green, to indicate that the H-VPLS 342 is still operational, or yellow, to indicate that the service has experienced some effect of the fault 335 but is still operational. In this particular example, an indication of normal state (green) for the H-VPLS 342 may be preferred in order to avoid confusion as to the location of the fault 335.

Supposing for the purposes of illustration that the redundant service connector 343 were not provided, then the H-VPLS 342 would be an affected service, which could be indicated by displaying its corresponding icon in red, for example.

In some embodiments, an icon representing a component communication service can be zoomed-in to show its service sites. Continuing with the above example of FIG. 12, a user might click on the icon representing the VPLS 324, thereby opening a more detailed representation of the specific service, which could be displayed in the same screen or a new screen. The fault 335 is preferably shown in the zoomed-in service representation.

As will be apparent from FIG. 8, service connectors 201, 203, 205 may also be displayed. Where more than one service connector is provided between component communication services, redundancy status, illustratively active or standby, can be indicated as well. With reference again to FIG. 12, if the service connector 341 is normally active, then redundancy indications for the service connectors 341, 343 would be switched after the fault 335 occurs.

Several examples of visual representations and information which may be indicated in such representations have been described above, although many variations of these specific examples are possible. For instance, both status and fault location could be displayed in a representation of the composite communication service 320 of FIG. 12. This would allow a user to quickly determine both where the fault 335 has occurred, and its effects on the composite communication service 320. Also, in some embodiments, alarms could be raised to alert personnel at a management system or potentially at another location to a detected event and/or its effects. This could be in accordance with predetermined and/or user-defined alarm policies.

Further variations are also possible, some of which may be apparent to those skilled in the art.

FIG. 14-16 are block diagrams of data structures in which information representing a composite communication service, a service connector, and a component communication service, respectively, may be stored. These data structures may be stored in the memory 78 of the system 70 (FIG. 3), for example, and updated as necessary to keep management system records accurate and current.

As noted above for the other drawings, FIGS. 14-16 present example data structures solely for the purposes of illustration, and do not limit the scope of the present invention. Other embodiments of the invention may include fewer, further, or different data fields arranged in a similar or different order than those shown.

The composite communication service data structure 370 includes information 372 such as a name and/or ID which identifies a composite communication service, information 374, 376 respectively identifying n component communication services of the composite communication service, such as a composite communication service name and/or ID, and other information 378 associated with the composite communication service, illustratively any or all of a description, aggregate operational state, number of composite communication services, and number of connectors.

The service connector data structure 380 includes information 382 such as name and/or ID identifying the service connector, information 383 indicating a type of the service connector, examples of which have been described above, information 384 such as name and/or ID identifying the composite communication service to which the service connector belongs, information 386, 388 such as name, ID, service site, and/or interface identifying the m endpoints connected by the service connector, and other service connector information 389, such as a state of the service connector. Although it is expected that service connectors will connect two communication services, one contemplated variation of the service connector concept is to define interconnections between more than two services.

The endpoint information provided at 386, 388 may include, for each communication service connected by the service connector, information identifying the communication service, a particular service site of the communication service, and connection information. A service connector which connects two services, services 1 and 2, for example, might include in the fields 386, 388 the data (Service ID 1, Service Site ID 1, SCP/bindingID/connection device ID 1) and (Service ID 2, Service Site ID 2, SCP/bindingID/connection device ID 2), respectively.

A component communication service is specified in the data structure 390 by a service identifier 392, which is information such as a name and/or ID identifying the communication service, a composite communication service identifier 394 which includes information identifying the composite communication service to which the service belongs, a composite communication service tier 396 indicating the tier or hierarchical level of the composite communication service to which the service has been assigned, and other information 398 such as service state.

Each data structure thus includes information identifying a composite communication service, at 372, 384, 394. The data structures also include information indicating whether a communication service supported in a communication system has a relationship with the composite communication service. In the data structures 370, 380 the information at 374/376 and 386/388 identify communication services which are related to the composite communication service. The service identifier 392 in the data structure 390 identifies a service which is related to the composite communication service identified at 394.

It should be appreciated that data records stored at a management system may include more than one of the data structures shown in FIGS. 14-16. A management system database may include one or more composite communication service data records embodying the data structure 370, one or more service connector data records embodying the data structure 380, and one or more communication service data records embodying the data structure 390.

It should also be noted that other embodiments of the invention may use variations of the example data structures 370, 380, 390. Where a service connector or service is allowed to belong to more than one composite communication service, for example, multiple composite communication services may be identified at 384, 394, for example. Further variations are also possible without departing from the invention.

What has been described is merely illustrative of the application of principles of embodiments of the invention. Other arrangements and methods can be implemented by those skilled in the art without departing from the scope of the present invention.

For example, in some embodiments, composite communication services can be handled substantially as component communication services, such as to move a composite communication service into another composite communication service.

Another type of service connector which has not specifically been described above is a service connector between one communication service which is within the management domain of a management system and another communication service which is outside the management domain. For this type of connector, one endpoint could be an SCP, and the other endpoint a string used to describe the other non-managed service.

In terms of event affect assessment, it should be appreciated that more than one event might occur or be affecting a composite communication service at one time. Assessment of simultaneous events may be performed substantially concurrently or serially.

Some of the example assessment scenarios described above refer to traversing a composite communication service structure from higher order tiers to lower order tiers. The invention is not in any way limited to this or any other specific traversal order. Service connectors between tiers might cause traversal within one tier, where services are connected in a daisy chain for instance. There are also functions and situations in which traversal from lower order tiers to higher order tiers may be warranted, such as to propagate fault indications or alarms toward higher order services.

Embodiments of the invention may provide further composite communication service-related features, including those described in the related patent applications referenced above.

It should also be appreciated that variations in the manner of implementing embodiments of the invention are contemplated. Although described primarily in the context of methods and systems, the techniques disclosed herein may also or instead be implemented as instructions stored on a machine-readable medium, for example.

We claim:

1. A system comprising:
    a composite communication service detector adapted to detect a plurality of communication services, supported in a communication system, for providing a composite communication service; and
    a composite communication service manager operatively coupled to the detector and adapted to determine for each detected communication service an associated communication service tier in a structure of the composite communication service, the composite communication service comprising a plurality of communication service tiers having an order in the structure, and to provide a representation of the composite communication service, the representation comprising an indication of each detected communication service and the tier order,
    wherein at least some communication services of the plurality of communication services are configured for operation with each other to provide the composite communication service by one or more service connectors, each service connector specifying a logical association between communication services, wherein the detector is further adapted to detect a service connector of the composite communication service, and wherein the representation further comprises an indication of the detected service connector,
    wherein the manager is further adapted to determine an extent to which an event directly affecting a portion of the composite communication service affects other portions of the composite communication service through any detected service connectors, and to include in the representation an indication of one or more of: the event, the directly affected portion of the composite communication service, and whether the event affects the other portions of the composite communication service.

2. The system of claim 1, wherein the manager is adapted to determine the communication service tier for a detected communication service by performing one or more of:
    determining the communication service tier of the plurality of communication service tiers to which a detected communication service has been assigned; and
    determining that a detected communication service has been newly added to the composite communication service and assigning the added communication service to a communication service tier of the plurality of communication service tiers.

3. The system of claim 1, wherein the plurality of communication service tiers comprises tiers associated with respective sets of one or more types of communication service.

4. The system of claim 1, wherein the manager is further adapted to determine whether a communication service in a communication service tier is affected by the event directly or through a service connector to a communication service in another communication service tier; where the communication service is affected by the event through a service connector, to determine whether the composite communication service includes a redundant service connector associating the communication service in the communication service tier with a communication service in the other communication service tier through a portion of the composite communication service which is not affected by the event; and to identify the communication service in the communication service tier as an affected communication service where the communication service is directly affected by the event, or the communication service is affected by the event through a service connector and the composite communication service does not include a redundant service connector associating the communication service with a communication service in the other communication service tier through a portion of the composite communication service which is not affected by the event.

5. The system of claim 4, wherein the manager is adapted to detect as a redundant service connector one or more of:
    a service connector associating the communication service in the communication service tier with another communication service in the communication service tier which is associated by a further service connector with a communication service in the other communication service tier through a portion of the composite communication service which is not affected by the event; and
    a service connector associating the communication service in the communication service tier with another communication service in the other communication service tier.

6. The system of claim 4, wherein the manager is further adapted to determine whether an identified affected communication service is associated with another communication service of the composite communication service by a service connector, and if so, to determine whether the other communication service is an affected communication service.

7. The system of claim 1, wherein the manager is further adapted to include in the representation an indication of an effect of the event on one or more of: a communication service directly affected by the event, a service connector directly affected by the event, a communication service affected by the event through one or more service connectors, and a service connector associating a communication service that is affected by the event, directly or through one or more service connectors, with another communication service.

8. A method comprising:
    defining a plurality of communication service tiers to include communication services, supported in a communication system, for providing a composite communication service, each communication service tier of the plurality of communication service tiers having a set of one or more criteria for assignment of communication services to the communication service tier;

defining a relative order of the plurality of communication service tiers in a structure of the composite communication service;

detecting relationships between communication services which provide a composite communication service;

assessing, based on the detected relationships, an extent to which an event directly affecting a portion of the composite communication service affects other portions of the composite communication service; and providing a representation of the composite communication service, the representation including an indication of a result of the assessing, wherein the composite communication service further comprises one or more service connectors specifying the relationships between communication services, wherein detecting relationships comprises detecting the one or more service connectors, wherein the assessing further comprises:

determining whether a communication service in a communication service tier is affected by the event directly or through a service connector to a communication service in another communication service tier;

where the communication service is affected by the event through a service connector, determining whether the composite communication service includes a redundant service connector specifying a relationship between the communication service in the communication service tier and a communication service in the other communication service tier through a portion of the composite communication service which is not affected by the event; and identifying the communication service in the communication service tier as an affected communication service where the communication service is directly affected by the event, or the communication service is affected by the event through a service connector and the composite communication service does not include a redundant service connector specifying a relationship between the communication service in the communication service tier and a communication service in the other communication service tier through a portion of the composite communication service which is not affected by the event.

9. The method of claim 8, wherein the criteria include criteria based on one or more of: a communication service type, a communication service tier of another communication service with which a communication service has been configured for operation, and an input specifying a communication service tier of the plurality of communication service tiers.

10. The method of claim 8, further comprising one or more of:

determining the communication service tier of the plurality of communication service tiers to which a communication service has been assigned; and determining that a communication service has been newly added to the composite communication service and assigning the added communication service to a communication service tier of the plurality of communication service tiers.

11. The method of claim 8, wherein assessing further comprises assessing one or more of: a type of a communication service of the composite communication service, a topology of the composite communication service, and a topology of a communication service of the composite communication service.

12. The method of claim 8, further comprising:

for an identified affected communication service, determining whether a service connector specifying a relationship between the affected communication service and another communication service of the composite communication service is affected by the event; and repeating the assessing for the other communication service where a service connector specifying a relationship between the affected communication service and another communication service of the composite communication service is affected by the event.

13. The method of claim 8, further comprising:

determining that an assessment trigger condition has been satisfied, the assessment trigger condition comprising one or more of: detection of an event in the communication system, detection of an input to invoke assessment of an event in the communication system, and receiving an indication of an event from a communication service of the plurality of the communication services or from a service connector specifying a relationship between communication services of the composite communication service, wherein the assessing is performed responsive to the assessment trigger condition being satisfied.

* * * * *